(12) United States Patent
Kobayashi et al.

(10) Patent No.: US 11,336,725 B2
(45) Date of Patent: May 17, 2022

(54) COMMUNICATION APPARATUS, COMMUNICATION METHOD, AND COMPUTER PROGRAM PRODUCT

(71) Applicant: KABUSHIKI KAISHA TOSHIBA, Minato-ku (JP)

(72) Inventors: Yuta Kobayashi, Ota (JP); Takahiro Yamaura, Kawasaki (JP); Masashi Ito, Yokohama (JP); Yasin Oge, Sagamihara (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 17/004,356

(22) Filed: Aug. 27, 2020

(65) Prior Publication Data
US 2021/0152635 A1    May 20, 2021

(30) Foreign Application Priority Data
Nov. 14, 2019    (JP) .............................. JP2019-206316

(51) Int. Cl.
*H04L 29/08* (2006.01)
*H04L 67/1097* (2022.01)

(52) U.S. Cl.
CPC ................................ *H04L 67/1097* (2013.01)

(58) Field of Classification Search
CPC ..... H04L 49/201; H04L 12/18; H04L 12/185; H04L 45/586; H04L 45/74; H04L 65/4076; H04L 49/70
See application file for complete search history.

(56) References Cited

U.S. PATENT DOCUMENTS

| 8,990,799 | B1 * | 3/2015 | Forecast ............. G06F 9/45558 |
| | | | 718/1 |
| 9,948,579 | B1 | 4/2018 | Sivaramakrishnan |
| 10,701,002 | B1 * | 6/2020 | Schroder ............... H04L 49/201 |
| 2009/0031054 | A1 | 1/2009 | Kato |

(Continued)

FOREIGN PATENT DOCUMENTS

| EP | 3822780 A1 * | 5/2021 | ........... G06F 3/0604 |
| EP | 3823230 A1 * | 5/2021 | ............. H04L 49/70 |

(Continued)

*Primary Examiner* — Shean Tokuta
(74) *Attorney, Agent, or Firm* — Oblon, McClelland, Maier & Neustadt, L.L.P.

(57) ABSTRACT

According to an embodiment, a communication apparatus includes a plurality of virtual machines, a storage unit, a transfer unit, and a descriptor output unit. The storage unit includes a multicast storage area specified for each multicast group and storing a multicast frame addressed to virtual machines belonging to a multicast group. The transfer unit writes the multicast frame into a multicast transfer virtual storage area mapped to the multicast storage area. The descriptor output unit outputs a descriptor of the multicast frame to the virtual machines belonging to the multicast group. The virtual machine includes a descriptor receiving unit and a reading unit. The descriptor receiving unit receives the descriptor. When the descriptor is received by the descriptor receiving unit, the reading unit reads the multicast frame from the multicast storage area specified based on the descriptor.

9 Claims, 17 Drawing Sheets

(56) References Cited

U.S. PATENT DOCUMENTS

| | | | | |
|---|---|---|---|---|
| 2012/0307827 A1* | 12/2012 | Yong | ........................ | H04L 12/18 |
| | | | | 370/390 |
| 2014/0177629 A1* | 6/2014 | Manula | ................ | H04L 49/201 |
| | | | | 370/390 |
| 2014/0192804 A1* | 7/2014 | Ghanwani | ............... | H04L 12/18 |
| | | | | 370/390 |
| 2016/0337423 A1* | 11/2016 | Uchida | ................... | H04L 45/74 |
| 2020/0089525 A1 | 3/2020 | Kobayashi et al. | | |
| 2020/0296057 A1* | 9/2020 | Mula | ........................ | H04L 47/15 |
| 2021/0149603 A1* | 5/2021 | Kobayashi | .......... | G06F 9/45558 |
| 2021/0152635 A1* | 5/2021 | Kobayashi | .......... | H04L 67/1097 |

FOREIGN PATENT DOCUMENTS

| | | | | |
|---|---|---|---|---|
| JP | 4974078 B2 | 7/2012 | | |
| JP | 2018-133758 A | 8/2018 | | |
| JP | 2020-48045 A | 3/2020 | | |
| JP | 2021082867 A | * 5/2021 | ........... | G06F 9/4881 |

* cited by examiner

FIG.5

| DESTINATION MAC ADDRESS | VLAN ID | TRANSFER DESTINATION INTERFACE | MULTICAST TRANSFER VIRTUAL STORAGE AREA ID | ATTRIBUTE |
|---|---|---|---|---|
| 01:80:c2:00:00:01 | 3 | 2, 3, 5 | 1 | MULTICAST |
| 00:16:3e:79:fe:77 | 1 | 6 | - | UNICAST |
| 01:00:5e:00:00:01 | 4 | 7, 8, 9 | 2 | MULTICAST |

FIG.6A

MULTICAST BUFFER INFORMATION

| BUFFER ID | BITMAP (n bit) | FREE STATE |
|---|---|---|
| 1 | 0110100000··· | 0 |
| 2 | 0010000000··· | 0 |
| 3 | 0000000000··· | 1 |
| ⋮ | | |
| x | 0000000000··· | 1 |

MULTICAST BUFFER INFORMATION

| BUFFER ID | BITMAP (n bit) | FREE STATE |
|---|---|---|
| 1 | 0000000000··· | 1 |
| 2 | 0000001000··· | 0 |
| 3 | 0000000000··· | 1 |
| ⋮ | | |
| y | 0000000000··· | 1 |

⋮

COMMUNICATION APPARATUS, COMMUNICATION METHOD, AND COMPUTER PROGRAM PRODUCT

CROSS-REFERENCE TO RELATED APPLICATIONS

This application is based upon and claims the benefit of priority from Japanese Patent Application No. 2019-206316, filed on Nov. 14, 2019; the entire contents of which are incorporated herein by reference.

FIELD

Embodiments described herein relate generally to a communication apparatus, a communication method, and a computer program product.

BACKGROUND

Real-time performance is required in fields such as an industrial network that connects devices in a factory and an in-vehicle network that connects controllers of an in-vehicle system. In recent years, Ethernet (registered trademark) has been increasingly used in the industrial network and the in-vehicle network, and various real-time Ethernet standards have been proposed.

However, with the conventional technology, it is difficult to further reduce the worst execution time of multicast (broadcast) transfer processing required for real-time communication.

BRIEF DESCRIPTION OF THE DRAWINGS

FIG. 5 is a diagram illustrating an example of a forwarding/filtering database (FDB) according to the first embodiment;

FIG. 6A is a diagram illustrating an example of multicast buffer information of the multicast storage area of FIG. 4A;

FIG. 6B is a diagram illustrating an example of multicast buffer information of the multicast storage area of FIG. 4B;

DETAILED DESCRIPTION

According to an embodiment, a communication apparatus includes a plurality of virtual machines, a storage unit, a transfer unit, and a descriptor output unit. The storage unit includes a multicast storage area specified for each multicast group and storing a multicast frame addressed to virtual machines belonging to the multicast group. The transfer unit is configured to write the multicast frame into a multicast transfer virtual storage area mapped to the multicast storage area. The descriptor output unit is configured to output a descriptor of the multicast frame to the virtual machines belonging to the multicast group. Each of the virtual machines includes a descriptor receiving unit and a reading unit. The descriptor receiving unit is configured to receive the descriptor. The reading unit is configured to read the multicast frame from the multicast storage area specified based on the descriptor when the descriptor is received by the descriptor receiving unit.

Exemplary embodiments of a communication apparatus, a communication method, and a computer program product will be explained below in detail with reference to the accompanying drawings.

A virtual computer technology has been applied to industrial systems and in-vehicle systems. By consolidating multiple virtual machines on one physical computer, cost reduction and other effects can be expected. With such a background, a software switch for communication processing between virtual machines is also required to support real-time Ethernet, but when it is implemented by software processing, it is difficult to implement a deterministic operation. In other words, in a real-time system, it is necessary to guarantee the worst case execution time (WCET). When different processings are executed by conditional branches, a part with the longest processing time determines the overall performance.

When a frame is transferred between virtual machines using the software switch, in most cases, unicast frame transfer processing is executed, but some frames are subjected to multicast (broadcast) processing. In a case of the multicast, frame copy to a buffer of a destination virtual machine (network interface) is performed at most (number of nodes connected to the switch-1) times. Data copy requires a long processing time and greatly affects the overall performance, and thus it is desired to eliminate the data copy as much as possible.

Description of Virtual Machine and Software Switch

Next, an example in which a software technology such as a virtualization technology is applied to an industrial system, an in-vehicle system, and the like will be described. For example, it is conceivable to implement a switch (virtual switch) that connects virtual machines with software.

Figure 1:
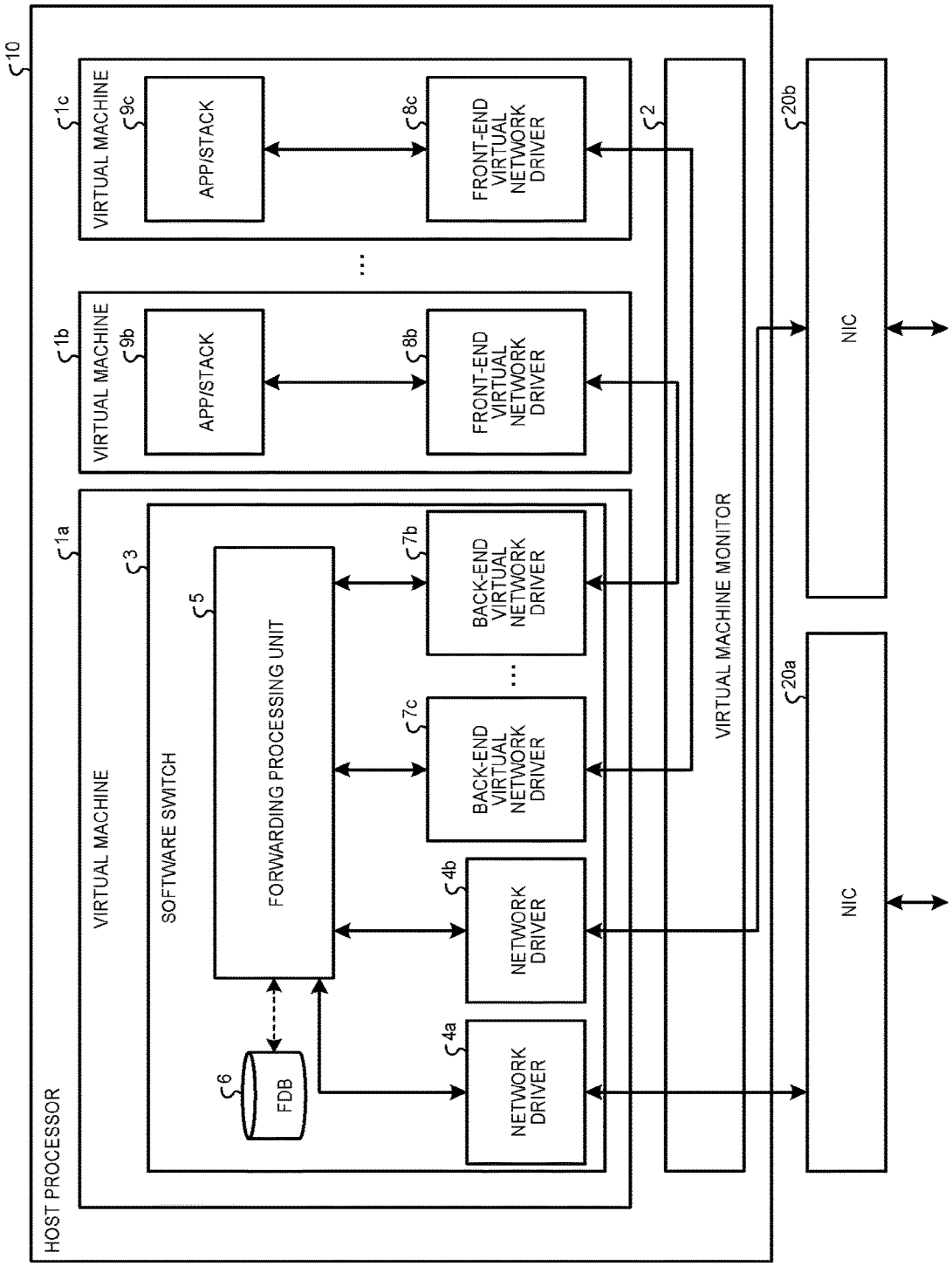
FIG. 1 is a schematic diagram illustrating an example of a communication apparatus in which a plurality of virtual machines are operated.

FIG. 1 is a schematic diagram illustrating an example of a communication apparatus 100 in which a plurality of virtual machines 1a to 1c are operated. The example of FIG. 1 illustrates a case where a switch function is implemented by the virtual machine 1a operated on a host processor 10. The communication apparatus 100 includes the host processor 10 and network interface cards (NICs) 20a and 20b.

The host processor 10 is a device that controls the communication apparatus 100. The NICs 20a and 20b are physical interfaces of the communication apparatus 100. A virtual machine monitor 2 controls the virtual machines 1a to 1c. The virtual machine monitor 2 is implemented by the host processor 10. The virtual machines 1a to 1c are operated on the virtual machine monitor 2.

The virtual machine 1a includes a software switch 3. The software switch 3 includes network drivers 4a and 4b, a forwarding processing unit 5, a forwarding/filtering database (FDB) 6, and back-end virtual network drivers 7b and 7c.

The network drivers 4a and 4b control communication between the NICs 20a and 20b and the forwarding processing unit 5. The network drivers 4a and 4b read frames (data) received by the NICs 20a and 20b and input the frame to the forwarding processing unit 5. Further, the network drivers 4a and 4b write frames received from the forwarding processing unit 5 into the NICs 20a and 20b.

The forwarding processing unit 5 refers to the FDB 6 to control a transfer destination of the frame.

The back-end virtual network drivers 7b and 7c control communication between the virtual machine 1a in which the software switch 3 is operated and other virtual machines 1b and 1c (guest OSs).

The virtual machine 1b includes a front-end virtual network driver 8b and an application/network stack (app/stack) 9b. The front-end virtual network driver 8b controls communication between the app/stack 9b and the software switch 3.

The virtual machine 1c includes a front-end virtual network driver 8c and an application/network stack (app/stack) 9c. The front-end virtual network driver 8c controls communication between the app/stack 9c and the software switch 3.

Description about Data Delivery Between Virtual Machines

Figure 2:
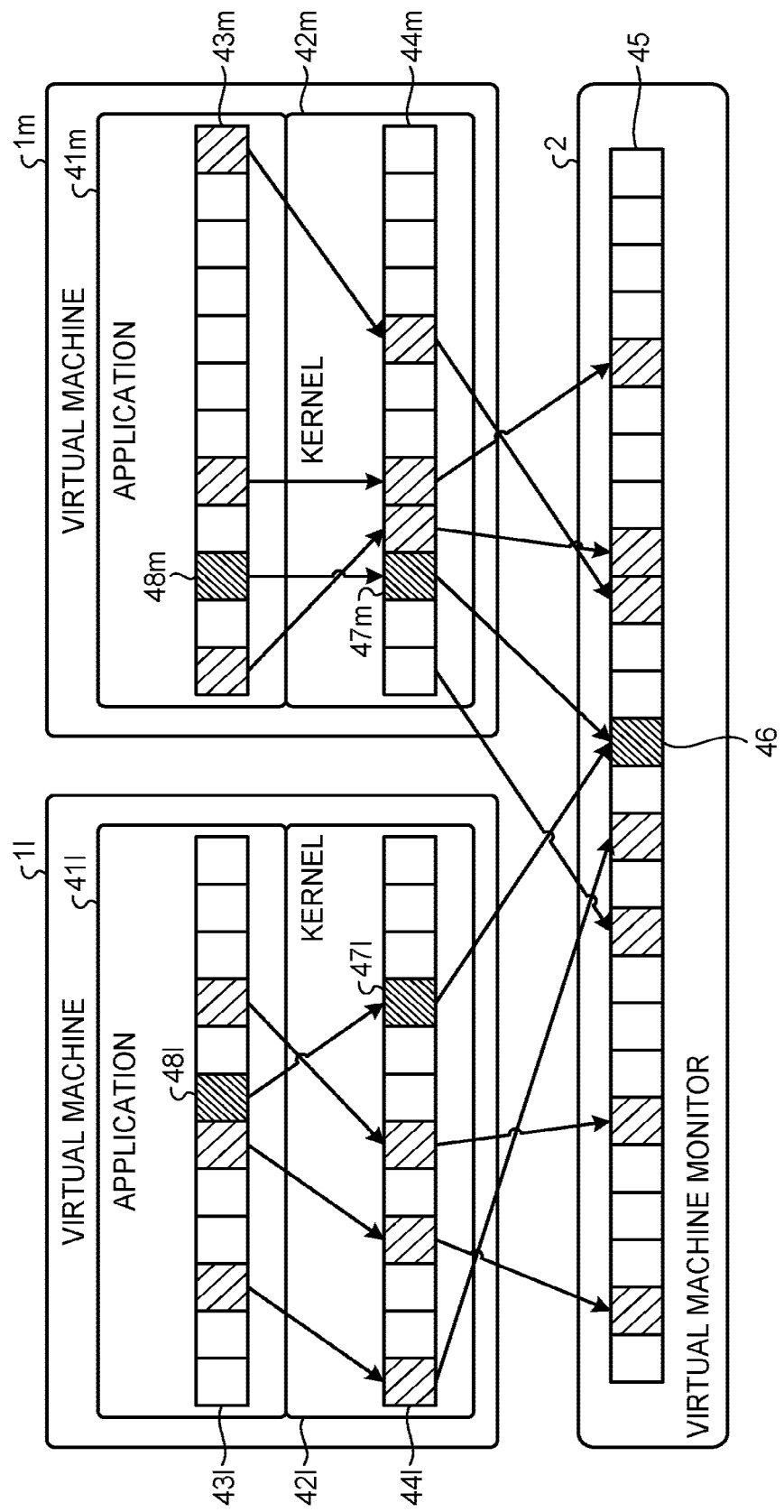
FIG. 2 is a diagram for describing data delivery between virtual machines.

FIG. 2 is a diagram for describing data delivery between virtual machines 1l and 1m.

The virtual machine 1l includes an application 41l and a kernel 42l. In the application 41l, data storage control is performed by a virtual memory 43l. In the kernel 42l, data storage control is performed by a pseudo-physical memory 44l. Similarly, in an application 41m, data storage control is performed by a virtual memory 43m. In a kernel 42m, data storage control is performed by a pseudo-physical memory 44m.

Hereinafter, when the virtual machines 1l and 1m need not be distinguished, the virtual machines 1l and 1m will be simply referred to as virtual machine 1. Similarly, when the virtual memories 43l and 43m need not be distinguished, the virtual memories 43l and 43m will be simply referred to as virtual memory 43. Similarly, when the pseudo-physical memories 44l and 44m need not be distinguished, pseudo-physical memories 44l and 44m will be simply referred to as pseudo-physical memory 44.

From the viewpoint of security and the like, functions provided to the guest OS (virtual machine 1) are limited so that each virtual machine 1 cannot directly access resources managed by other virtual machines 1. For example, the virtual machine monitor 2 executes processing such as access to a physical memory 45, a control of hardware such as NICs and storage devices, and issuance of privileged instructions. The virtual machine 1 issues a command such as a hypercall or VMExit, such that the virtual machine monitor 2 executes processing according to the hypercall or VMExit (hereinafter, a description will be made using the hypercall).

Data delivery between the virtual machines 1 is implemented by issuing the hypercall described above. The example of FIG. 2 illustrates an example of data delivery performed in a manner in which the plurality of virtual machines 1l and 1m share the same physical memory area 46. Each virtual machine 1 can directly access the virtual memory 43 and the pseudo-physical memory 44, and manages mapping information (correspondence) between the virtual memory 43 and the pseudo-physical memory 44. The virtual machine monitor 2 manages mapping information of the physical memory (machine memory) 45 and the pseudo-physical memory 44.

The memory mapping information is managed in page units (size such as 4 KB or 64 KB). Conversion between a virtual memory address or a pseudo-physical address, and a physical address is performed by a memory management unit (MMU), thereby enabling access to the physical memory based on the virtual memory address or the pseudo-physical address. In general, one area (page) of the physical memory 45 is mapped to the virtual memory 43 and the pseudo-physical memory 44 on a one-to-one basis.

As one of methods for delivering data between the virtual machines 1, there is a method of allowing a plurality of virtual machines 1 to access the same physical memory 45, like the physical memory area 46. An example of an operation of associating a pseudo-physical memory area 47l (virtual memory area 48l) of the virtual machine 1l and a pseudo-physical memory area 47m (virtual memory area 48m) of the virtual machine 1m with the same physical memory area 46 will be described (note that the operation is not limited thereto).

The virtual machine 1l issues a hypercall (setup) that instructs memory mapping, and makes a notification to the virtual machine monitor 2 so that the virtual machine 1m can perform mapping to the pseudo-physical memory area 47l. Information to be notified includes an address of the pseudo-physical memory area 47l, information of the virtual machine (the virtual machine 1m in FIG. 2) that is permitted to perform mapping, access restriction (read only, read/write, or the like), or the like.

The virtual machine monitor 2 receives the hypercall, allows the virtual machine 1m to perform mapping to the physical memory area 46 mapped to the pseudo-physical memory area 47l, and returns an identifier of corresponding memory mapping information to the virtual machine 1l. The virtual machine 1l notifies the virtual machine 1m of the identifier received using a control interface provided by the virtual machine monitor 2, or the like.

The virtual machine 1m issues a hypercall (map) to instruct the virtual machine monitor 2 to map the pseudo-physical memory area 47l and the pseudo-physical memory area 47m to each other. Information to be notified includes an address of the pseudo-physical memory area 47m, the identifier notified from the virtual machine 1l, information on a virtual machine as a mapping destination, or the like. The virtual machine monitor 2 specifies the physical memory area 46 based on the notified identifier and maps the pseudo-physical memory area 47m.

To deliver data from the virtual machine 1*l* to the virtual machine 1*m*, the virtual machine 1*l* maps a page (the virtual memory area 48*l* or the pseudo-physical memory area 47*l*) in which data is written to a page of the virtual machine 1*m*, such that the virtual machine 1*m* can refer to the data. After the data delivery is completed (the virtual machine 1*m* reads the data), the virtual machine 1*m* issues a hypercall (unmap) to unmap the pseudo-physical memory area 47*m* and the physical memory area 46.

The above-described processing is data delivery processing using the mapping of the same physical memory area 46.

In addition to the mapping to the same physical memory area 46, the method for delivering data also includes a method such as a copy method or a transfer method. In the copy method, data are copied between physical memory areas referenced by two virtual memory areas (pseudo-physical memory areas) designated by the virtual machine monitor 2. In the transfer method, mapping between two physical memory areas referenced by two virtual memory areas (pseudo-physical memory areas) designated by the virtual machine monitor 2 is replaced. Since the physical memory 45 is controlled in both the copy method and the transfer method, the virtual machine 1 needs to issue a hypercall to the virtual machine monitor 2.

Description about Multicast and Broadcast

Next, unicast processing, multicast processing, and broadcast processing will be described.

The forwarding processing unit 5 refers to the FDB 6 and executes the unicast processing in a case where an entry that matches a combination of a destination MAC address and a VLAN ID of a frame exists and the number of destination interfaces is one. In a case of the unicast processing, the forwarding processing unit 5 transfers a frame to one interface described in an entry of the FDB 6.

In a case where the entry that matches the combination of the destination MAC address and the VLAN ID of the frame exists in the FDB 6, and the number of destination interfaces is plural, the forwarding processing unit 5 executes the multicast processing. In a case of the multicast processing, the forwarding processing unit 5 transfers a frame (multicast frame) to two or more interfaces described in an entry of the FDB 6. Here, the frame is copied to and written in a buffer of each interface. That is, in a case of the multicast, frame copy is performed as many times as the number of destination interfaces.

In a case where the entry that matches the combination of the destination MAC address and the VLAN ID of the frame does not exist in the FDB 6, the forwarding processing unit 5 executes the broadcast processing. In a case of the broadcast processing, the forwarding processing unit 5 transfers a frame (broadcast frame) to all interfaces other than a transmission source interface connected to the software switch. In a case where the number of interfaces of the software switch is n, the frame copy is performed (n−1) times.

Note that the broadcast frame may be treated as a special case of a multicast frame transmitted to a plurality of destinations (a case of being transmitted to all destinations).

As described above, it is necessary to guarantee the worst case execution time in the real-time system. Since the data copy requires a relatively long processing time as compared with that of other processing, a processing time of the multicast processing or the broadcast processing is longer than that of the unicast processing. In other words, the processing time of the multicast processing or the broadcast processing is likely to be the worst case execution time, which greatly affects the overall performance of the system.

Usually, the majority of frames are subjected to the unicast processing, and a small number of frames are subjected to the multicast processing or broadcast processing. It is not preferable that the overall performance is determined based on the multicast processing or broadcast processing that is less frequently executed.

First Embodiment

With such a background, according to a first embodiment, for the multicast (broadcast) processing, a buffer area that can be referenced by all virtual machines (destination interfaces) is prepared, and a transfer control unit (software switch) notifies each virtual machine of only a descriptor.

Example of Functional Configuration

Figure 3:
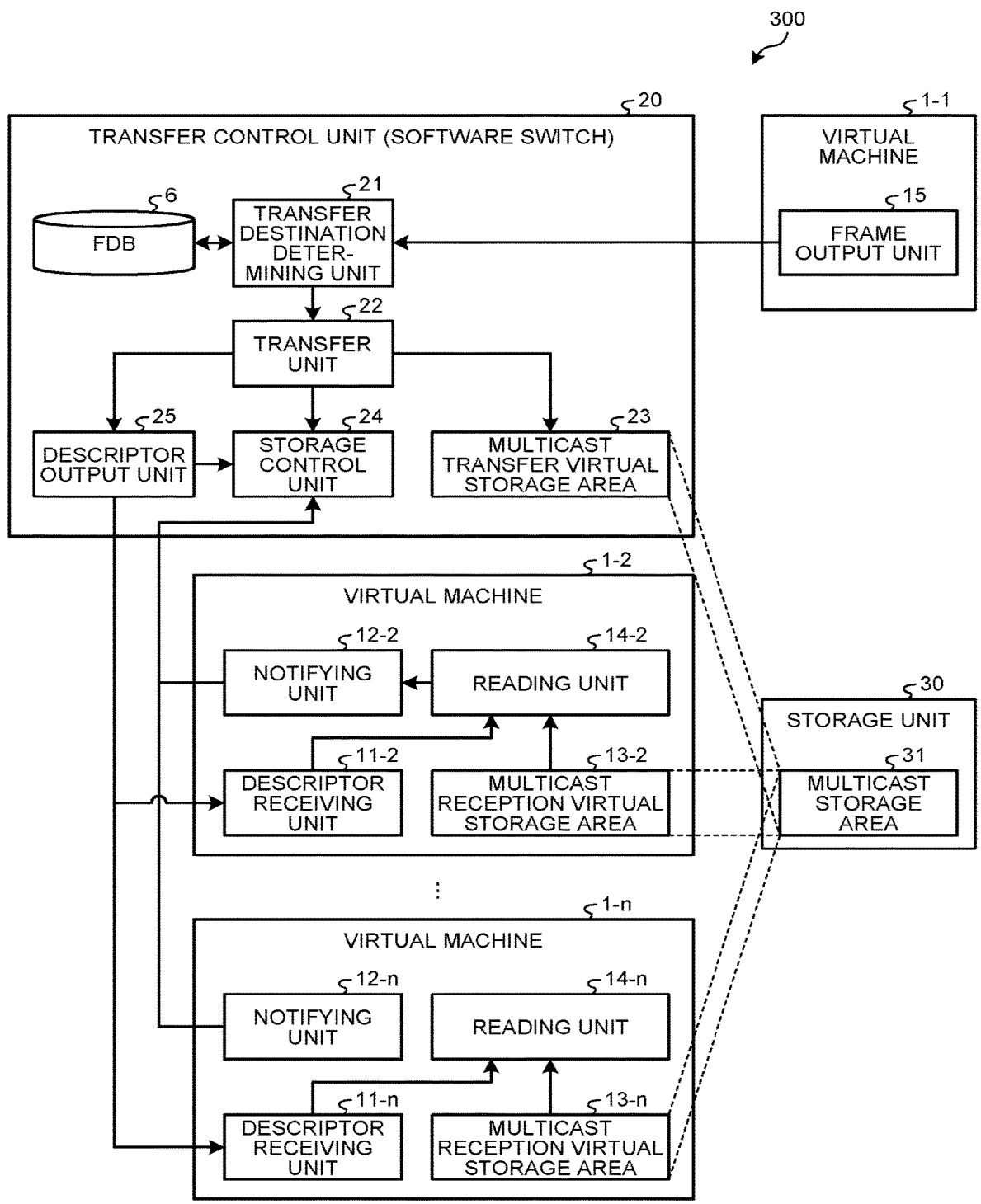
FIG. 3 is a diagram illustrating an example of a functional configuration of a communication apparatus according to a first embodiment.

FIG. 3 is a diagram illustrating an example of a functional configuration of a communication apparatus 300 according to the first embodiment. The communication apparatus 300 according to the first embodiment includes virtual machines 1-1 to 1-*n*, a transfer control unit 20, and a storage unit 30.

Hereinafter, when the virtual machines 1-1 to 1-*n* need not be distinguished, the virtual machines 1-1 to 1-*n* will be simply referred to as virtual machine 1. Note that other components of which the number is plural may also be abbreviated when those components need not be distinguished, similarly to the virtual machines 1-1 to 1-*n* that are referred to as virtual machine 1.

In the example of FIG. 3, n virtual machines 1 are connected to the transfer control unit (software switch). The transfer control unit 20 may be operated on the virtual machine 1 or the virtual machine monitor 2.

The example of FIG. 3 illustrates an example in which the virtual machine 1-1 transmits a multicast (broadcast) frame. The virtual machine 1-1 as a transmission source includes a frame output unit 15. The frame output unit 15 receives a frame from an application or a network stack, and inputs the frame to the transfer control unit 20.

The transfer control unit 20 executes frame transfer control processing between the virtual machines 1. The transfer control unit 20 includes a transfer destination determining unit 21, an FDB 6, a transfer unit 22, a multicast transfer virtual storage area 23, a storage control unit 24, and a descriptor output unit 25.

The virtual machine 1-2 as a destination includes a descriptor receiving unit 11-2, a notifying unit 12-2, a multicast reception virtual storage area 13-2, and a reading unit 14-2. The virtual machines 1-3 to 1-*n* also have the same configuration as that of the virtual machine 1-2.

The multicast transfer virtual storage area 23 and the multicast reception virtual storage area 13 will be described. The multicast transfer virtual storage area 23 is a part of the virtual memory area 43 (pseudo-physical memory area 44) managed by the transfer control unit 20. The multicast reception virtual storage area 13 is a part of the virtual memory area 43 (pseudo-physical memory area 44) managed by a destination virtual machine 1.

The multicast transfer virtual storage area 23 and the multicast reception virtual storage area 13 used to perform frame transfer for a certain multicast group, are mapped to the same area (multicast storage area 31) of the storage unit (physical memory 45). The multicast storage area 31 is specified for each multicast group and stores a multicast frame addressed to virtual machines 1 belonging to a multicast group.

Further, even in a case where the multicast transfer virtual storage area 23 and the multicast reception virtual storage area 13 are used for the broadcast frame, similarly, the multicast transfer virtual storage area 23 and the multicast reception virtual storage area 13 are mapped to the same area (multicast storage area 31) of the storage unit 30 (physical memory 45). In the first embodiment, the multicast transfer virtual storage area 23 and the multicast reception virtual storage area 13 are each configured with a plurality of buffer areas so that a plurality of frames can be stored.

Figure 4A:
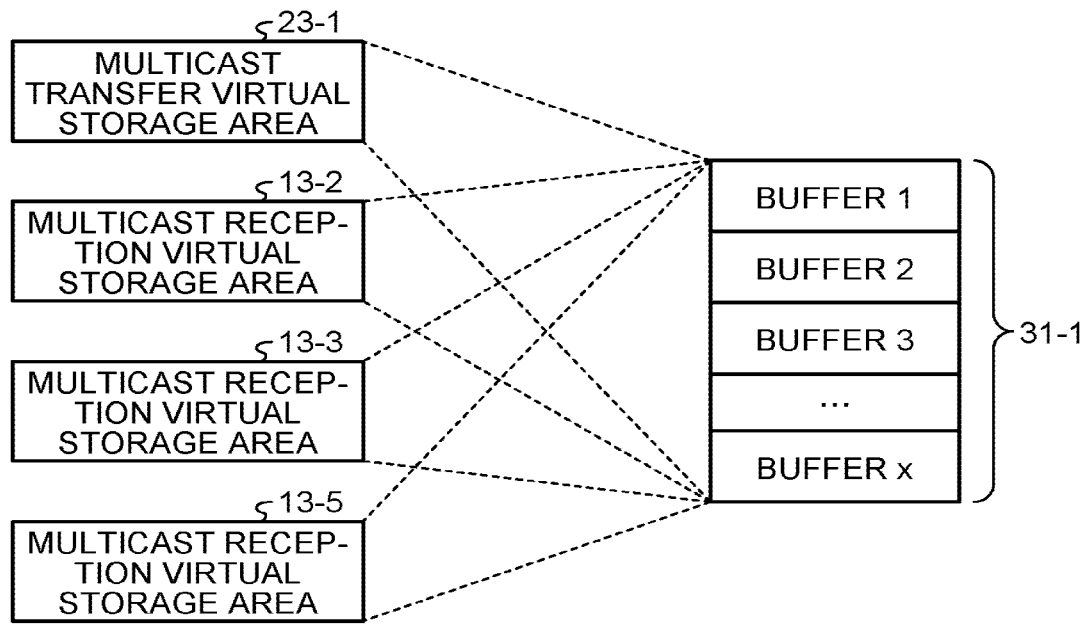
FIG. 4A is a diagram illustrating a first example of mapping of a multicast storage area according to the first embodiment.

FIG. 4A is a diagram illustrating a first example of mapping of a multicast storage area 31-1 according to the first embodiment. The multicast storage area 31-1 is a part of the multicast storage area 31. x buffers (Buffer 1 to Buffer x) exist in the multicast storage area 31-1, which can be used for transferring x frames at the same time. The example of FIG. 4A illustrates a case where a multicast frame is transmitted to a multicast group including the virtual machines 1-2, 1-3, and 1-5. In the example of FIG. 4A, the multicast storage area 31-1 is mapped to a multicast transfer virtual storage area 23-1. The multicast transfer virtual storage area 23-1 is a part of the multicast transfer virtual storage area 23. Further, the multicast storage area 31-1 is mapped to the multicast reception virtual storage area 13-2 of the virtual machine 1-2, a multicast reception virtual storage area 13-3 of the virtual machine 1-3, and a multicast reception virtual storage area 13-5 of the virtual machine 1-5.

Figure 4B:
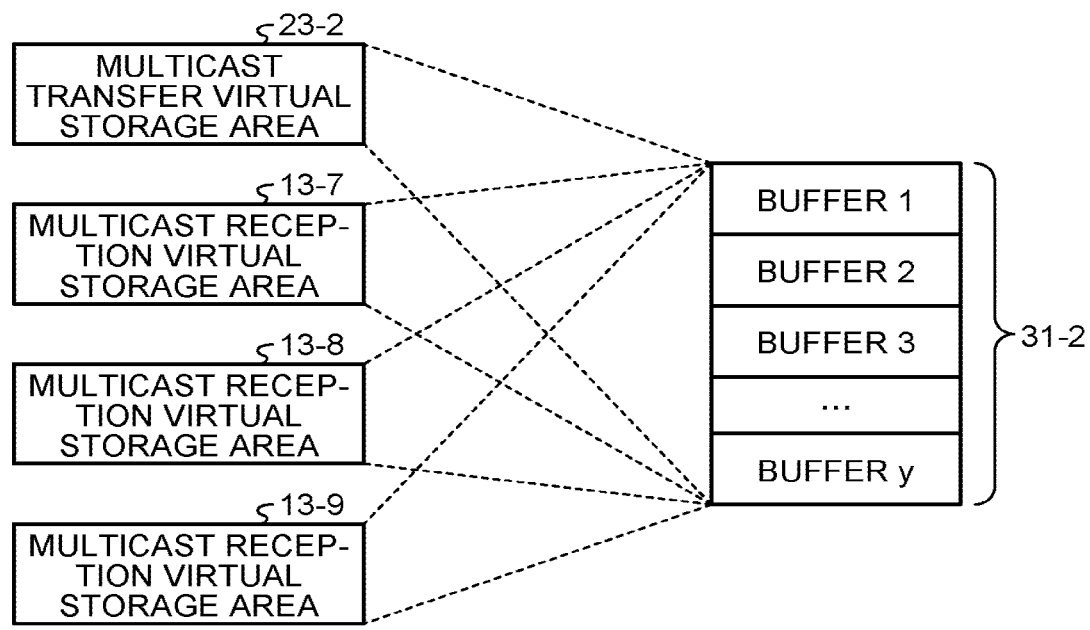
FIG. 4B is a diagram illustrating a second example of mapping of a multicast storage area according to the first embodiment.

FIG. 4B is a diagram illustrating a second example of mapping of a multicast storage area 31-2 according to the first embodiment. The multicast storage area 31-2 is a part of the multicast storage area 31. y buffers (Buffer 1 to Buffer y) exist in the multicast storage area 31-2, which can be used for transferring y frames at the same time. The example of FIG. 4B illustrates a case where a multicast frame is transmitted to a multicast group including the virtual machines 1-7, 1-8, and 1-9. In the example of FIG. 4B, the multicast storage area 31-2 is mapped to a multicast transfer virtual storage area 23-2. The multicast transfer virtual storage area 23-2 is a part of the multicast transfer virtual storage area 23. Further, the multicast storage area 31-2 is mapped to a multicast reception virtual storage area 13-7 of the virtual machine 1-7, a multicast reception virtual storage area 13-8 of the virtual machine 1-8, and a multicast reception virtual storage area 13-9 of the virtual machine 1-9.

Note that in a case of the broadcast frame, the multicast reception virtual storage areas 13 of all virtual machines 1 are mapped to the same area (multicast storage area 31) of the storage unit 30 (physical memory 45).

Next, an operation according to the first embodiment will be described.

First, the transfer control unit 20 will be described. First, the transfer destination determining unit 21 refers to header information of a frame received from the frame output unit 15, and the FDB 6 to determine a transfer destination interface (destination virtual machine 1) of the frame.

For example, an entry of the FDB 6 has an attribute indicating the multicast, the unicast, or the like as illustrated in FIG. 5, and the transfer destination determining unit 21 may determine a transfer method based on the attribute.

Example of FDB

FIG. 5 is a diagram illustrating an example of the FDB 6 according to the first embodiment. The FDB 6 according to the first embodiment includes a destination MAC address, a VLAN ID, a transfer destination interface, a multicast transfer virtual storage area ID, and an attribute. The destination MAC address is compared with a destination MAC address of a transfer target frame. The VLAN ID is identification information of a VLAN.

The transfer destination interface corresponds to the destination virtual machine 1. For example, a transfer destination interface #2 corresponds to the destination virtual machine 1-2.

The multicast transfer virtual storage area ID is information for identifying the multicast transfer virtual storage area 23. A multicast transfer virtual storage area ID #1 is identification information for identifying the multicast transfer virtual storage area 23-1. The multicast transfer virtual storage area 23-1 corresponds to the multicast storage area 31-1 in the physical memory 45. A multicast transfer virtual storage area ID #2 is identification information for identifying the multicast transfer virtual storage area 23-2. The multicast transfer virtual storage area 23-2 corresponds to the multicast storage area 31-2 in the physical memory 45.

The attribute indicates a frame transfer method. The unicast or the multicast is set in the attribute. Note that the transfer destination determining unit 21 determines to broadcast a transfer target frame in a case where an entry that matches a combination of a destination MAC address and a VLAN ID of the transfer target frame does not exist in the FDB 6, or in a case where a destination address is a broadcast address.

Further, for example, the transfer destination determining unit 21 may determine whether or not to perform the multicast based on an individual/group (I/G) bit of a MAC address of a frame.

Further, for example, the transfer destination determining unit 21 may determine whether or not to perform the broadcast based on a destination MAC address. In a case where an entry corresponding to the destination MAC address of the frame exists in the FDB 6, and the number of transfer destination interfaces included in the entry is one, the transfer destination determining unit 21 determines to transfer the frame using the unicast. Further, in a case where the entry corresponding to the destination MAC address of the frame exists in the FDB 6, and the number of transfer destination interfaces included in the entry is plural, the transfer destination determining unit 21 determines to transfer the frame using the multicast. Further, in a case where the entry corresponding to the destination MAC address of the frame does not exist, or in a case where a destination address is a broadcast address, the transfer destination determining unit 21 determines to transfer the frame using the broadcast.

The transfer destination determining unit 21 notifies the transfer unit 22 of transfer destination control information. The transfer destination control information includes, for example, an attribute (unicast/multicast/broadcast), a destination IF (transfer destination interface in FIG. 5), and an identifier of the multicast transfer virtual storage area 23 to be used (multicast transfer virtual storage area ID in FIG. 5). Since the operation according to the first embodiment is related to the multicast processing or the broadcast processing, an operation in a case where it is determined to perform the multicast processing and the broadcast processing will be described below.

Next, the transfer unit 22 will be described. In a case of multicast (broadcast), the transfer unit 22 refers to the multicast buffer information held by the storage control unit 24 to select a frame storage position (buffer to be used) of the multicast transfer virtual storage area 23.

Here, the multicast buffer information will be described. The multicast buffer information is stored for each multicast storage area 31 (multicast group).

FIG. 6A is a diagram illustrating an example of multicast buffer information 50-1 of the multicast storage area 31-1 of FIG. 4A. The multicast buffer information 50-1 includes a bitmap (n bits) and a free state for each buffer included in the multicast storage area 31-1.

In the bitmap, each bit corresponds to the interface (virtual machine 1). For example, the first bit (first from left) corresponds to the virtual machine 1-1, the second bit (second from left) corresponds to the virtual machine 1-2, and the n-th bit corresponds to the virtual machine 1-$n$, in a sequential manner. A bit of 0 indicates that the buffer is already referenced (read) or that it is not the destination virtual machine 1. A bit of 1 indicates that the buffer is not referenced (transfer is not completed).

The free state indicates free of each buffer (1: free, 0: in use).

FIG. 6B is a diagram illustrating an example of multicast buffer information 50-2 of the multicast storage area 31-2 of FIG. 4B. The multicast buffer information 50-2 includes a bitmap (n bits) and a free state for each buffer included in the multicast storage area 31-2. A description of the bitmap (n bits) and the free state is the same as in FIG. 6A, and thus is omitted.

The description returns to the operation of the transfer unit 22. The transfer unit 22 refers to the multicast buffer information 50 of the multicast storage area 31 mapped to the multicast transfer virtual storage area 23 identified with the multicast transfer virtual storage area ID (FIG. 5) notified from the transfer destination determining unit 21 to select a buffer whose free state is 1.

Next, the transfer unit 22 writes the frame in the selected buffer. Next, the transfer unit 22 sets the free state of the multicast buffer information to 0 (in use), sets a bit corresponding to the destination virtual machine in the bitmap to 1 (frame unreferenced state), and sets the other bits to 0.

Finally, the transfer unit 22 notifies the descriptor output unit 25 that the frame is written.

Next, the descriptor output unit 25 will be described. Once the notification is received from the transfer unit 22, the descriptor output unit 25 outputs a descriptor storing the information of the transfer target frame to the descriptor receiving unit 11 of the destination virtual machine 1. The descriptor includes, for example, information (address and the like) of the buffer in which the frame is written, or an attribute (unicast/multicast/broadcast). The descriptor output unit 25 outputs, for example, a descriptor of a multicast frame to a plurality of virtual machines 1 belonging to a multicast group.

Finally, the storage control unit 24 will be described. Once the output of the descriptor to all transfer target virtual machines 1 is completed, the storage control unit 24 waits for a read completion notification of the notifying unit 12. Information to be notified includes, for example, information of the multicast group for the corresponding frame, an identifier of a buffer of which reading is completed, and an identifier of an interface (destination virtual machine) that has completed reading. Once the read completion notification is received from the notifying unit 12, the storage control unit 24 updates information of an entry of corresponding multicast buffer information. For example, in a case where the read completion notification is received from the virtual machine 1-2, the storage control unit 24 changes the second bit from the left of the bitmap from 1 (unreferenced) to 0 (referenced).

In a case where the read completion notification is received from all the transfer target virtual machines 1 (in a case where all bits included in a bitmap corresponding to the selected buffer are 0), the storage control unit 24 sets the free state of the multicast buffer information to 1 to release the buffer.

The above-described operation is the operation of the transfer control unit 20.

Next, an operation in which the destination virtual machine 1 receives a multicast (broadcast) frame will be described.

First, when the descriptor receiving unit 11 receives a descriptor from the descriptor output unit 25, the descriptor receiving unit 11 notifies the reading unit 14 of an identifier of a buffer described in the descriptor.

The reading unit 14 reads the frame from the multicast reception virtual storage area 13 (multicast storage area 31) based on the notified identifier of the buffer, and inputs the frame to an application or a network stack. Once the reading (reception) of the frame is completed, the reading unit 14 notifies the notifying unit 12 of the completion.

Finally, the notifying unit 12 transmits a read completion notification indicating that the reading of the frame is completed to the storage control unit 24 of the transfer control unit 20.

The above-described operation is the operation of the destination virtual machine 1.

Additional Description on Multicast Buffer Information

The multicast buffer information 50 will be additionally described. In the first embodiment (FIGS. 6A and 6B), whether or not each destination virtual machine 1 has received a frame is managed by using a bitmap, but the present invention is not limited thereto. As an example, a method using a counter value can be considered. For example, the storage control unit 24 sets a value indicating the number of destination interfaces as a counter value at the time of frame transmission, and decrements the counter value by 1 each time the read completion notification is received from the notifying unit 12. When the counter value becomes 0, the storage control unit 24 determines that all the destination virtual machines 1 have received the frame, and releases the buffer of the multicast storage area 31.

Additional Description on Mapping Timing of Multicast Storage Area

The mapping of the multicast storage area 31 will be additionally described. As illustrated in FIGS. 4A and 4B, the multicast transfer virtual storage area 23 and the multicast reception virtual storage area 13, each of which is the virtual memory 43 (pseudo-physical memory 44), are mapped to the same physical memory 45 (multicast storage area 31-1 or 31-2) for each multicast group. A timing for mapping the virtual memory 43/pseudo-physical memory 44 and the physical memory 45 to each other will be described.

Firstly, a method of performing mapping at a timing at which an entry with an attribute of the multicast is statically registered in the FDB 6 can be considered. Examples in which the entry is statically registered in the FDB 6 can include manual setting performed by an operator and initialization of the communication apparatus 300 (switch) (an entry registered in initial setting). Here, the transfer control unit 20 (storage control unit 24) maps the multicast storage area 31 (physical memory 45) referenced by the multicast transfer virtual storage area 23 (virtual memory 43/pseudo-physical memory 44) of the transfer control unit 20 to multicast reception virtual storage areas 13 of all the destination virtual machines 1.

That is, in the first example, the operation of the communication apparatus 300 is as follows, for example. The storage control unit 24 maps the multicast reception virtual storage area 13 to the multicast storage area 31 when an entry of a multicast frame is registered in the FDB 6 (transfer destination information). When a descriptor is received by the descriptor receiving unit 11, the reading unit 14 reads the multicast frame from the multicast reception virtual storage area 13 mapped to the multicast storage area 31 specified based on the descriptor. Then, the storage control unit 24 releases the mapping between the multicast reception virtual storage area 13 and the multicast storage area 31 when the entry of the multicast frame is deleted from the FDB 6 (transfer destination information).

Secondly, a method of performing mapping at a timing at which an entry is dynamically registered in the FDB 6 by Internet group management protocol (IGMP)/multicast listener discovery (MLD) snooping or the like can be considered. It is assumed that a certain virtual machine 1 transmits an IGMP join message or MLDv1/v2 Report message to join a multicast group X. The transfer control unit 20 (transfer destination determining unit 21) snoops these messages and registers the virtual machine 1 as a destination interface of a multicast entry of the FDB 6. Here, the transfer control unit 20 (storage control unit 24) maps the multicast transfer virtual storage area 23 (virtual memory 43/pseudo-physical memory 44) of the transfer control unit 20 to the multicast reception virtual storage area 13 of the virtual machine 1 from which the IGMP join message or MLDv1/v2 Report message is transmitted.

Further, the transfer control unit 20 (storage control unit 24) releases the mapping of the corresponding multicast reception virtual storage area 13 at a timing at which the entry is deleted from the FDB 6 because frame transfer is not performed for a certain period. For example, when an IGMP/MLD leave message is detected, the transfer control unit (storage control unit 24) releases the mapping of the corresponding multicast reception virtual storage area 13.

That is, in the second example, the operation of the communication apparatus 300 is as follows, for example. The storage control unit 24 maps the multicast reception virtual storage area 13 to the multicast storage area when a notification of joining a multicast group is received. When a descriptor is received by the descriptor receiving unit 11, the reading unit 14 reads the multicast frame from the multicast reception virtual storage area 13 mapped to the multicast storage area 31 specified based on the descriptor. Then, the storage control unit 24 releases the mapping between the multicast reception virtual storage area 13 and the multicast storage area 31 when a notification of leaving the multicast group is received.

Thirdly, a method, in which when a virtual machine 1 is started (when binding with the transfer control unit 20), the transfer control unit 20 (storage control unit 24) maps the physical memory 45 referenced by the multicast transfer virtual storage area 23 (virtual memory 43/pseudo-physical memory 44) used for the broadcast to the multicast reception virtual storage area 13 (virtual memory 43/pseudo-physical memory 44) of the started virtual machine 1, can be considered. When the virtual machine 1 is deleted (when the virtual machine 1 and the transfer control unit 20 are disconnected), the transfer control unit 20 (storage control unit 24) releases the mapping made when the virtual machine 1 is started.

Example of Communication Method

Figure 7:
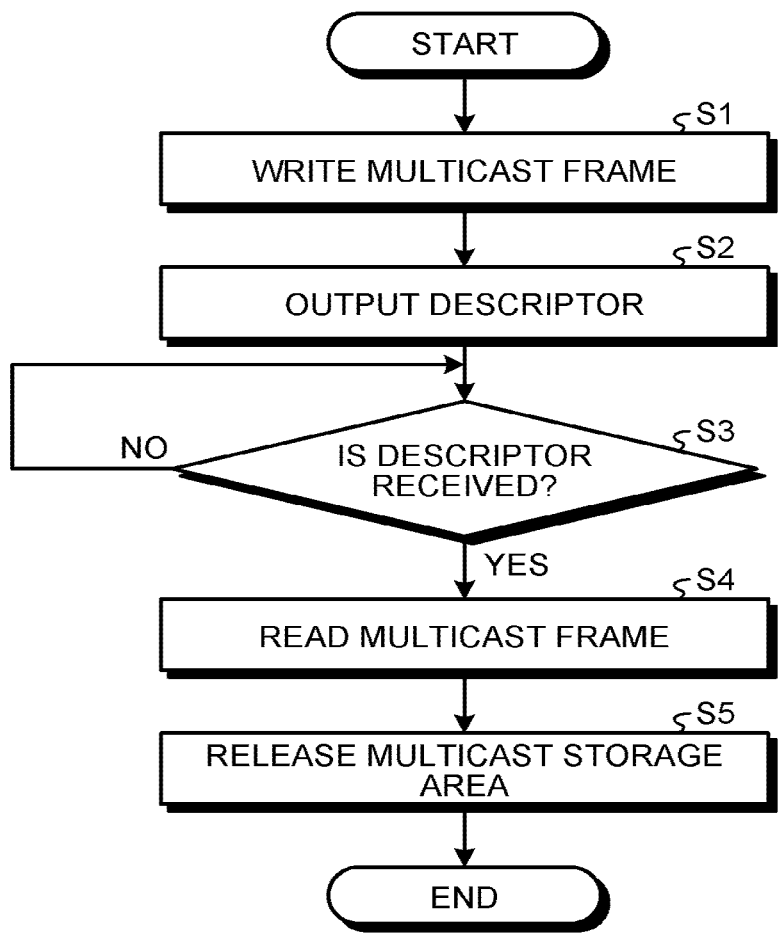
FIG. 7 is a flowchart illustrating an example of a communication method according to the first embodiment.

FIG. 7 is a flowchart illustrating an example of a communication method according to the first embodiment. First, the transfer unit 22 writes a multicast frame in the multicast transfer virtual storage area 23 mapped to the multicast storage area 31 (Step S1). Next, the descriptor output unit 25 outputs a descriptor of the multicast frame written by the processing of Step S1 to virtual machines 1 belonging to a multicast group (Step S2).

Next, the descriptor receiving unit 11 of each of the virtual machines 1 belonging to the multicast group determines whether or not the descriptor transmitted by the processing of Step S2 is received (Step S3).

In a case where the descriptor is received (Step S3, Yes), the reading unit 14 reads the multicast frame written by the processing of Step S1 from the multicast storage area (Step S4). Specifically, the reading unit 14 reads the multicast frame from the multicast reception virtual storage area 13 mapped to the multicast storage area 31.

Next, the storage control unit 24 releases the multicast storage area 31 after the multicast frame is read by the reading unit 14 of each of all virtual machines 1 belonging to the multicast group (Step S5).

As described above, in the communication apparatus 300 according to the first embodiment, the storage unit 30 includes the multicast storage area 31 that is specified for each multicast group and stores a multicast frame addressed to virtual machines belonging to a multicast group. The transfer unit 22 writes the multicast frame in the multicast transfer virtual storage area 23 mapped to the multicast storage area 31. The descriptor output unit 25 outputs a descriptor of the multicast frame to the virtual machines 1 belonging to the multicast group. The descriptor receiving unit 11 receives the descriptor. Then, when the descriptor is received by the descriptor receiving unit 11, the reading unit 14 reads the multicast frame from the multicast reception virtual storage area 13 specified based on the descriptor.

As a result, with the communication apparatus 300 according to the first embodiment, it is possible to further reduce the worst case execution time of the multicast transfer processing required for real-time communication. Specifically, a buffer area (multicast storage area 31) for the multicast (broadcast) is prepared in the storage unit 30 (physical memory 45), and each destination virtual machine 1 can access the same physical memory 45, thereby reducing the number of times a multicast (broadcast) frame is copied.

Second Embodiment

Next, a second embodiment will be described. In a description of the second embodiment, a description of the same content as that of the first embodiment is omitted, and only differences from the first embodiment will be described.

In the first embodiment, all transfer processings are executed in the transfer control unit 20 (software switch). In the second embodiment, a transmission-side virtual machine 1 determines a transfer destination, and a frame is directly delivered to a virtual machine 1 as the destination. That is, in the first embodiment, the number of times copy from the transfer control unit 20 to the destination virtual machine 1 is performed is reduced, whereas in the second embodiment, the number of times copy from the transmission source virtual machine 1 to the destination virtual machine 1 is performed is reduced.

Description of TSN

First, an example of a standard used in fields such as industrial networks and in-vehicle networks that require high real-time performance will be described.

For example, as a standard for realizing real-time performance on Ethernet (registered trademark), standardization of Time-Sensitive Networking (TSN) is in progress by IEEE 802.1 TSN Task Group. TSN includes a plurality of standards. TSN is a standard that extends Audio/Video Bridging (AVB) and realizes low latency, which is used for professional audio and the like. TSN is a standard that aims to achieve high reliability in addition to higher real-time performance than AVB so that it can be applied to industrial networks and in-vehicle networks.

One of the TSN standards is IEEE 802.1Qbv. IEEE 802.1Qbv enables a strict control of a transmission timing of data (frame) for each priority (traffic class) by controlling a plurality of transmission buffers (transmission queues in IEEE 802.1Qbv) with different priorities according to preset schedule information (gate control list). Each transmission buffer is provided with a gate that permits data transmission. When the gate is open (open state), data transmission is permitted, and when the gate is closed (close state), data transmission is prohibited.

Description of Implementation of IEEE 802.1Qbv with Software Switch

A case of implementing communication processing that strictly controls a transmission timing of each frame, such as IEEE 802.1Qbv with a software switch will be described.

Figure 8:
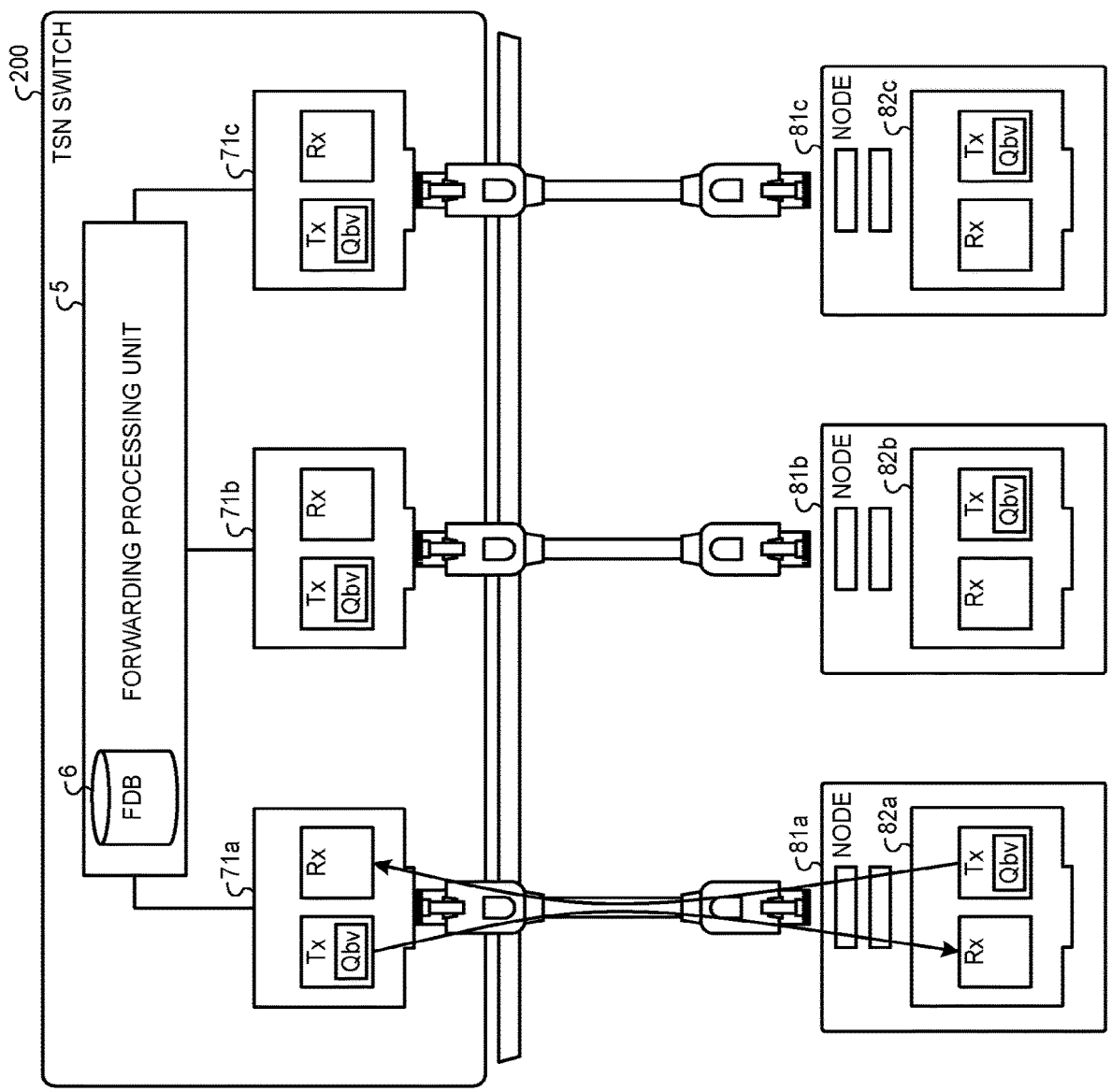
FIG. 8 is a diagram illustrating an example of a Qbv-compatible Time-Sensitive Networking (TSN) switch using normal hardware.

FIG. 8 illustrates an example of a Qbv-compatible TSN switch 200 using normal hardware. In FIG. 8, the TSN switch 200 includes three network interfaces 71a to 71c. The network interfaces 71a to 71c are connected to network interfaces 82a to 82c of nodes 81a to 81c, respectively. Each of the network interfaces 71a to 71c and 82a to 82c executes transmission processing (Tx) and reception processing (Rx). The transmission processing (Tx) is compatible with IEEE 802.1Qbv, and determines a frame transmission timing according to preset schedule information (Qbv).

Figure 9:
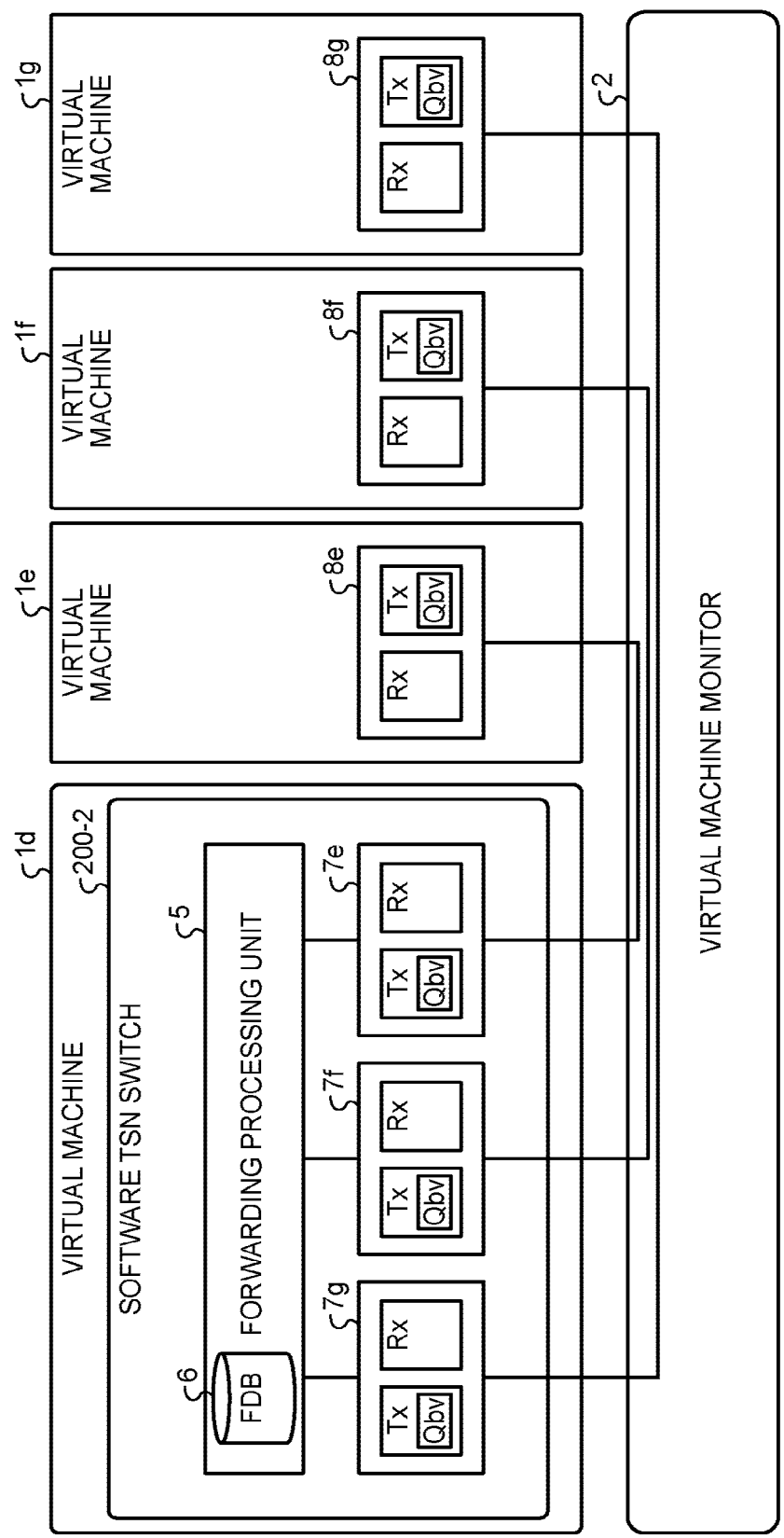
FIG. 9 is a diagram illustrating an example of a Qbv-compatible software TSN switch using a virtual machine.

FIG. 9 is a diagram illustrating an example of a Qbv-compatible software TSN switch 200-2 using a virtual machine 1d. The example of FIG. 9 illustrates a case in which the nodes 81a to 81c of FIG. 8 are consolidated as virtual machines 1e to 1g on one physical machine, and these virtual machines 1e to 1g are connected to a TSN switch (software TSN switch 200-2) implemented by the virtual machine 1d.

In a case where the TSN switch is simply virtualized as illustrated FIG. 9, front-end virtual network drivers 8e to 8g of guest OSs (virtual machines 1e to 1g) and back-end virtual network drivers 7e to 7g of the software TSN switch 200-2 each execute Qbv processing.

In this case, the following two problems occur.
(1) Time synchronization between virtual machines
(2) Guest OS processing overhead First, (1) will be described. In TSN (Qbv), the respective network nodes are synchronized in time, and the synchronized time and schedule information are referenced to control a frame transmission timing. Therefore, also in the configuration of FIG. 9, it is necessary to synchronize times of system clocks or real-time clocks (RTCs) of the virtual machines 1d to 1g. As a synchronization method, a method using the precision time protocol (PTP) as in normal network processing or a method in which a virtual machine monitor or a driver provides a time synchronization function can be considered, but in any case, processing overhead occurs.

Next, (2) will be described. In a case where real-time communication such as TSN is implemented by software, it is preferable to reduce a processing time or fluctuation (jitter) in processing time by using a real time OS (RTOS) or the like. However, as an OS operated on each of the virtual machines 1e to 1g (each network node), a general-purpose OS is used depending on application. In general-purpose OS task scheduling, a complicated control is performed for efficiency in use of a central processing unit (CPU) and power saving. This causes difficulty in estimating the execution time, and the deterministic operation required for real-time processing (real-time communication) cannot be implemented.

As a method for solving the above problem, it is conceivable to concentrate processings related to Qbv in one virtual machine 1d.

Figure 10:
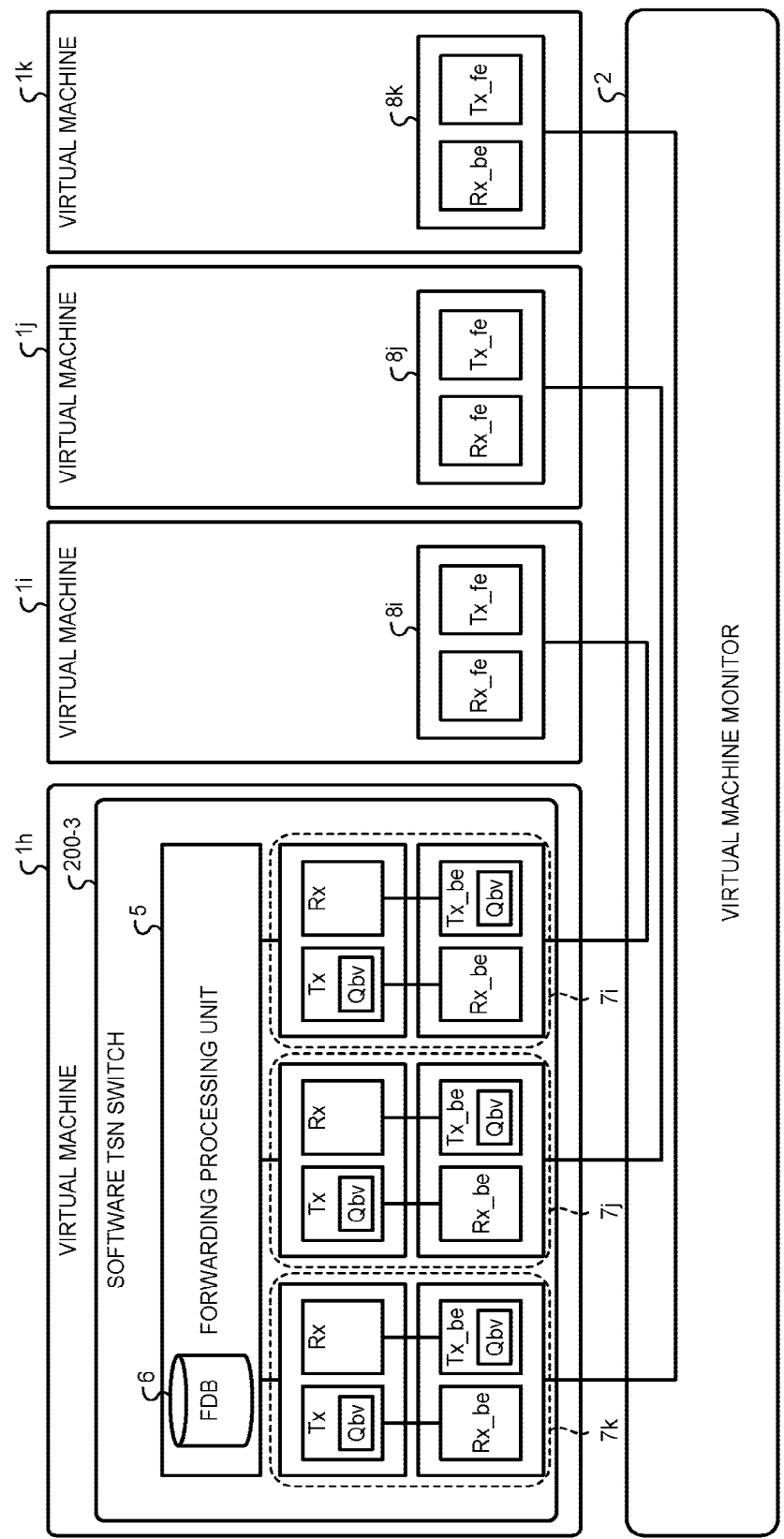
FIG. 10 is a diagram illustrating an example in which processings related to Qbv are concentrated in one virtual machine.

FIG. 10 is a diagram illustrating an example in which processings related to Qbv are concentrated in one virtual machine 1h. In FIG. 10, processing in each of the front-end virtual network drivers 8e to 8g of FIG. 9 is separated into back-end processing units Tx_be and Rx_be related to TSN and other front-end processing units Tx_fe and Rx_fe. A part related to TSN is processed by back-end virtual network drivers 7i to 7k of a software TSN switch 200-3.

Tx_be executes transmission processing including Qbv processing of each of virtual machines 1i to 1k. As processing other than the Qbv processing, IEEE 802.1Qav, Strict Priority (queue priority control), IEEE 802.1CB (redundancy processing), and the like can be considered, but the present invention is not limited thereto.

Rx_be executes reception processing of each of the virtual machines 1i to 1k. In Rx_be, IEEE 802.1Qci (filtering processing), IEEE 802.1CB (redundancy processing), and the like can be executed, but the present invention is not limited thereto.

Tx_fe and Rx_fe execute frame delivery process between each of the virtual machines 1i to 1k and the software TSN switch 200-3.

As described above, with the configuration of FIG. 10, the processings related to TSN are concentrated in one virtual machine 1h (software TSN switch 200-3). As a result, times referenced in the TSN processing can be aggregated into one, and there is no need to perform time synchronization processing between the plurality of virtual machines 1i to 1k as illustrated FIG. 10. Further, even in a case of using a general-purpose OS on each of the virtual machines 1i to 1k, a part related to the TSN processing is not affected by task scheduling of the general-purpose OS.

Description of Operation of Software TSN Switch

An operation of the software TSN switch 200-3 in a case of using data delivery by the mapping of the same physical memory area 46 will be described. In the following description, the software TSN switch 200-3 will be referred to as frame transfer unit 200-3.

Figure 11:
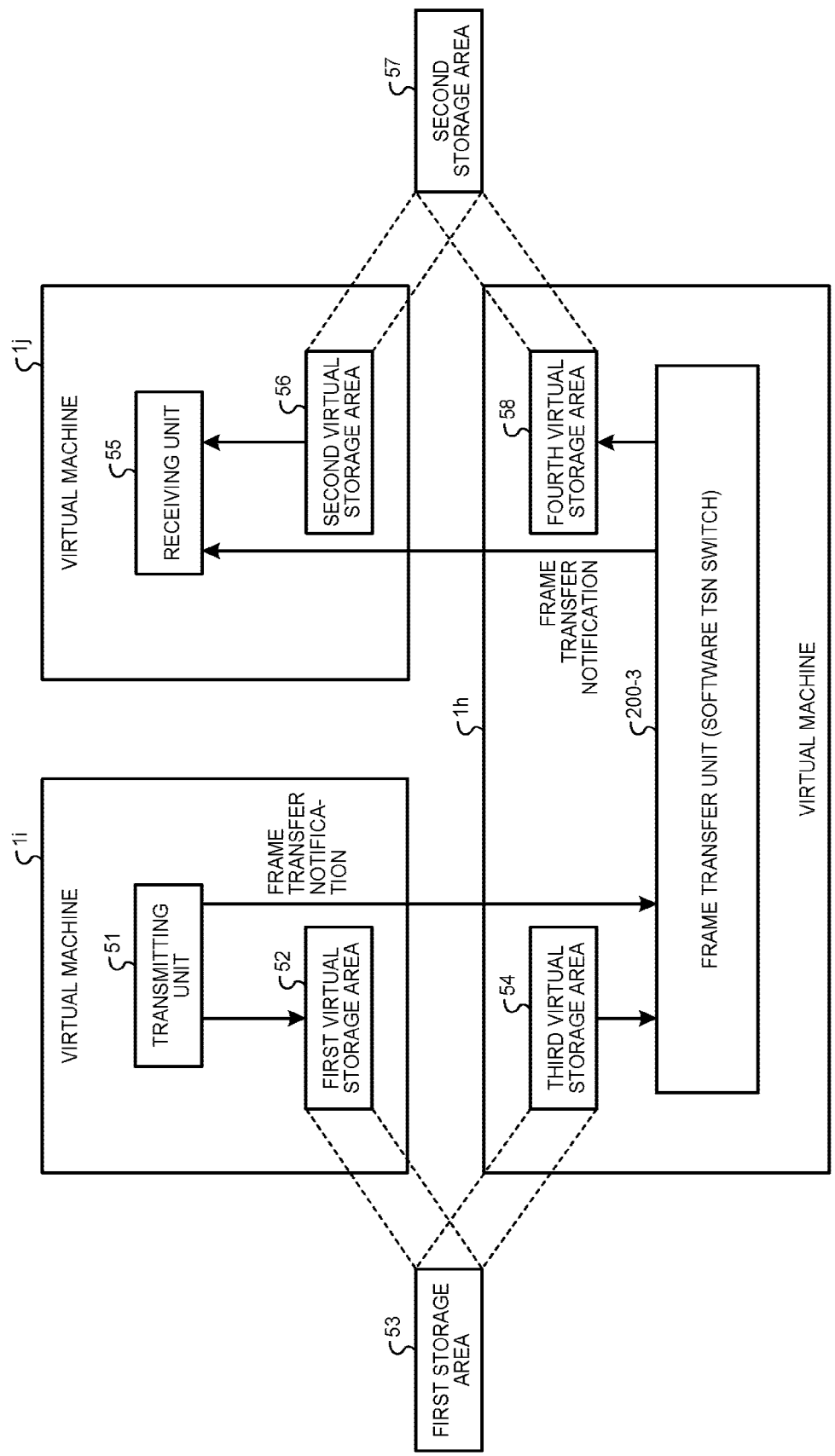
FIG. 11 is a diagram for describing an example of an operation of the software TSN switch.

FIG. 11 is a diagram for describing an example of an operation of the software TSN switch 200-3. The frame transfer unit 200-3 is operated on a virtual machine 1h, but may also be implemented by the virtual machine monitor 2 instead of the virtual machine 1h. In the example of FIG. 11, a frame is transferred from the virtual machine 1i to the virtual machine 1j.

The virtual machine 1i includes a transmitting unit 51 (Tx_fe of a front-end virtual network driver 8i) that executes frame transmission processing, and a first virtual storage area 52.

The transmitting unit 51 writes the frame in the first virtual storage area 52 and makes a notification to the frame transfer unit 200-3. The first virtual storage area 52 is a part of a pseudo-physical memory or virtual memory managed by the virtual machine 1*i*. The first virtual storage area 52 is used as a transmission buffer for the frame transfer unit 200-3.

The virtual machine 1*j* includes a receiving unit 55 (Rx_fe of a front-end virtual network driver 8*j*) that executes frame reception processing, and a second virtual storage area 56. The receiving unit 55 receives a frame transfer notification from the frame transfer unit 200-3 and reads the frame from the second virtual storage area 56. The second virtual storage area 56 is a part of a pseudo-physical memory or virtual memory managed by the virtual machine 1*j*. The second virtual storage area 56 is used as a reception buffer from the frame transfer unit 200-3.

The virtual machine 1*h* includes the frame transfer unit 200-3, a third virtual storage area 54, and a fourth virtual storage area 58. The third virtual storage area 54 and the fourth virtual storage area 58 are each a part of a pseudo-physical memory or virtual memory managed by the virtual machine 1*h*. The third virtual storage area 54 is used as a reception buffer for the virtual machine 1*i*. The fourth virtual storage area 58 is used as a transmission buffer for the virtual machine 1*j*. The frame transfer unit 200-3 executes frame transfer process between the virtual machines 1.

A first storage area 53 and a second storage area 57 are each a part of the physical memory 45 managed by the virtual machine monitor 2.

Hereinafter, details of an operation when transferring a frame from the virtual machine 1*i* to the virtual machine 1*j* will be described.

First, an operation of the transmitting unit 51 will be described. First, the transmitting unit 51 writes a frame received from an application or network stack in the first virtual storage area 52. Next, the transmitting unit 51 issues a hypercall (setup) so that the virtual machine 1*h* can also perform mapping to the first storage area 53 referenced by the first virtual storage area 52. Next, the transmitting unit 51 issues a frame transfer notification to the frame transfer unit 200-3.

Through the frame transfer notification, mapping information of the first storage area 53 that is acquired as transferred frame information with the hypercall, or the like is notified. Finally, when a transfer completion notification is received from the frame transfer unit 200-3, the transmitting unit 51 performs release of a transmission buffer, or the like, and ends the frame transfer processing.

Next, an operation of the receiving unit 55 will be described. The receiving unit 55 issues a hypercall (setup) in advance so that the virtual machine 1*h* can also perform mapping to the second storage area 57 to which a free reception buffer (second virtual storage area 56) is mapped. When the frame transfer notification is received from the frame transfer unit 200-3, the receiving unit 55 specifies a reception buffer in which the frame is written from information received through the frame transfer notification. The receiving unit 55 delivers the frame from the specified reception buffer to the application or network stack. The receiving unit 55 finally releases the reception buffer so that the virtual machine 1*h* can perform mapping to the reception buffer that has become a free area.

Finally, an operation of the frame transfer unit 200-3 will be described. When the frame transfer notification is received from the transmitting unit 51, the frame transfer unit 200-3 executes transfer processing. First, the frame transfer unit 200-3 issues a hypercall (map) to map the first storage area 53 notified through the mapping information to the reception buffer (the third virtual storage area 54 in the example of FIG. 11).

The frame transfer unit 200-3 reads the frame from the third virtual storage area 54 (first storage area 53) and determines a destination by referring to frame header information and the FDB 6 (in the example of FIG. 11, the virtual machine 1*j* is the destination). The frame transfer unit 200-3 copies the frame to a transmission buffer (in the example of FIG. 11, the transmission buffer is the fourth virtual storage area 58 and is assumed as being mapped to the second storage area 57 by issuance of the hypercall (map) performed in advance) for the destination virtual machine, and issues the frame transfer notification to the receiving unit 55 of the virtual machine 1*j*. Once the copy is completed, the frame transfer unit 200-3 issues a hypercall (unmap) to release the mapping between the third virtual storage area 54 and the first storage area 53, and issues the transfer completion notification to the transmitting unit 51 of the virtual machine 1*i*. Further, when the transmission to the virtual machine 1*j* is completed, the frame transfer unit 200-3 issues a hypercall (unmap) to release the mapping between the fourth virtual storage area 58 and the second storage area 57.

The above-described processing is processing for the frame transfer from the virtual machine 1*i* to the virtual machine 1*j*. In the above example, the virtual machines 1*i* and 1*j* issue the hypercall (setup) and the virtual machine 1*h* issues the hypercall (map/unmap), but the opposite may also be possible.

Further, in the above example, mapping/unmapping is performed each time a frame is transferred, but a configuration in which an area mapped at the time of starting is reused may also be applicable.

Further, although the hypercall (map) is used for data delivery in the above example, copy (hypercall (copy)) or transfer (hypercall (Transfer)) may also be used.

In the example of FIG. 11, data copy is performed once and issuance of a hypercall is performed six times as follows.

Data copy: once

Data copy from third virtual storage area 54 (first storage area 53) to fourth virtual storage area 58 (second storage area 57)

Hypercall: six times

Setup (change of access authority or the like) of first virtual storage area 52 (first storage area 53)

Mapping between first storage area 53 and third virtual storage area 54

Unmapping of first storage area 53 and third virtual storage area 54

Setup (change of access authority or the like) of second virtual storage area 56 (second storage area 57)

Mapping between second storage area 57 and fourth virtual storage area 58

Unmapping of second storage area 57 and fourth virtual storage area 58

Generally, data copy between memories or a hypercall (switching between the virtual machine 1 and the virtual machine monitor 2) requires a long processing time. In addition, fluctuation (jitter) in processing time is also large. In a case of the data copy, it is difficult to estimate the processing time due to contention in memory access. In a case of the hypercall, it is difficult to estimate the processing time due to issuance of privileged instructions or an influence of a scheduler of the virtual machine monitor.

In view of the above problems, it is preferable to reduce the number of times data copy is performed and the number of times issuance of a hypercall is performed as much as possible. As one means for reducing the number of times data copy is performed and the number of times issuance of a hypercall is performed, a method of using a dedicated network for each pair of a transmission-side virtual machine 1n or 1o and a reception-side virtual machine 1p or 1q without using the switch as illustrated in FIG. 12 can be considered.

Figure 12:
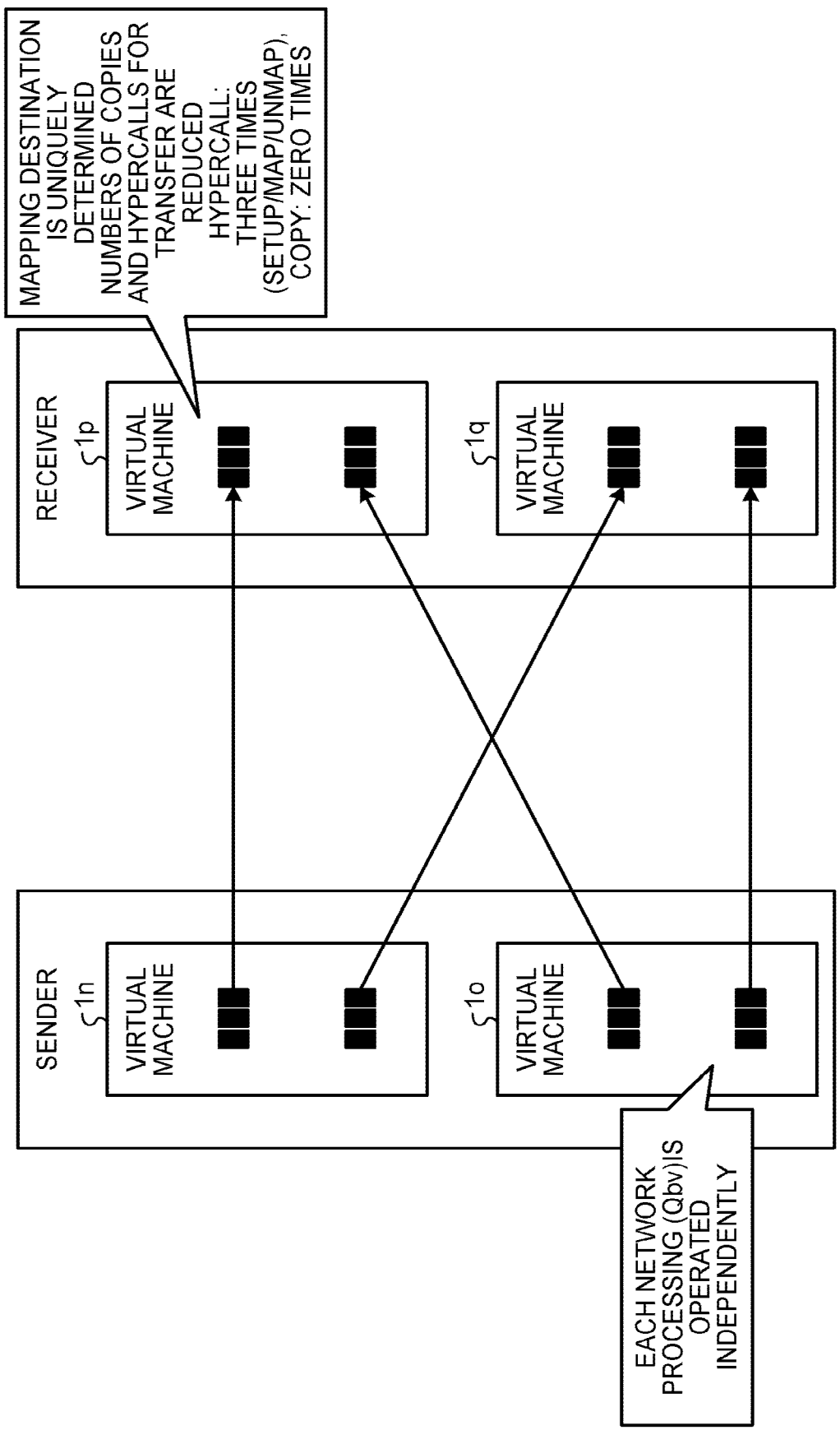
FIG. 12 is a diagram illustrating an example in which virtual machines are connected by a dedicated network.

In FIG. 12, since a correspondence between a transmission buffer of the transmission-side virtual machine 1 and a reception buffer of the reception-side virtual machine 1 is uniquely determined (a mapping destination is uniquely determined), the number of data copies for transfer and the number of hypercalls for transfer can be reduced. Specifically, data copy is not performed, and the number of hypercalls is three times (setup/map/unmap for the transmission buffer and the reception buffer).

However, FIG. 12 poses a problem in real-time communication processing such as TSN. In FIG. 12, processing of each dedicated network is independent. As described above, in TSN, each network node needs to be operated in time synchronization. For example, it is assumed that the virtual machine 1n and the virtual machine 1o each transmit a frame to the virtual machine 1p. In a case where the Qbv processing is executed correctly, frames arrive at the virtual machine 1p in an order specified by the scheduling in advance. However, in a case where each network is operated independently as illustrated FIG. 12, the frame arrival order cannot be guaranteed.

Hereinafter, a communication apparatus according to the second embodiment that is compatible with IEEE 802.1Qbv will be described.

Example of Functional Configuration

Figure 13A:
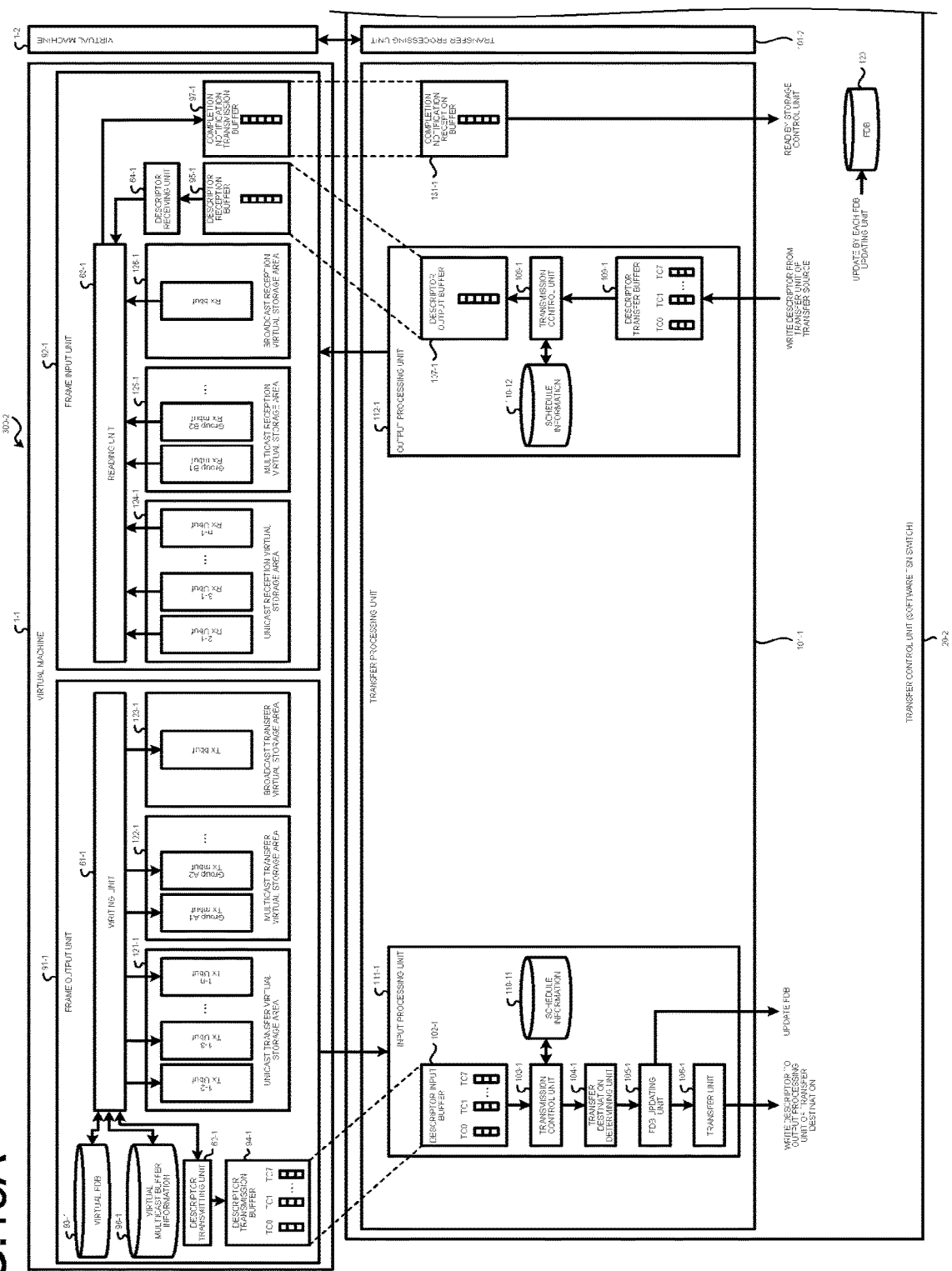
FIG. 13A is a diagram illustrating an example of a functional configuration of a communication apparatus according to a second embodiment.
Figure 13B:
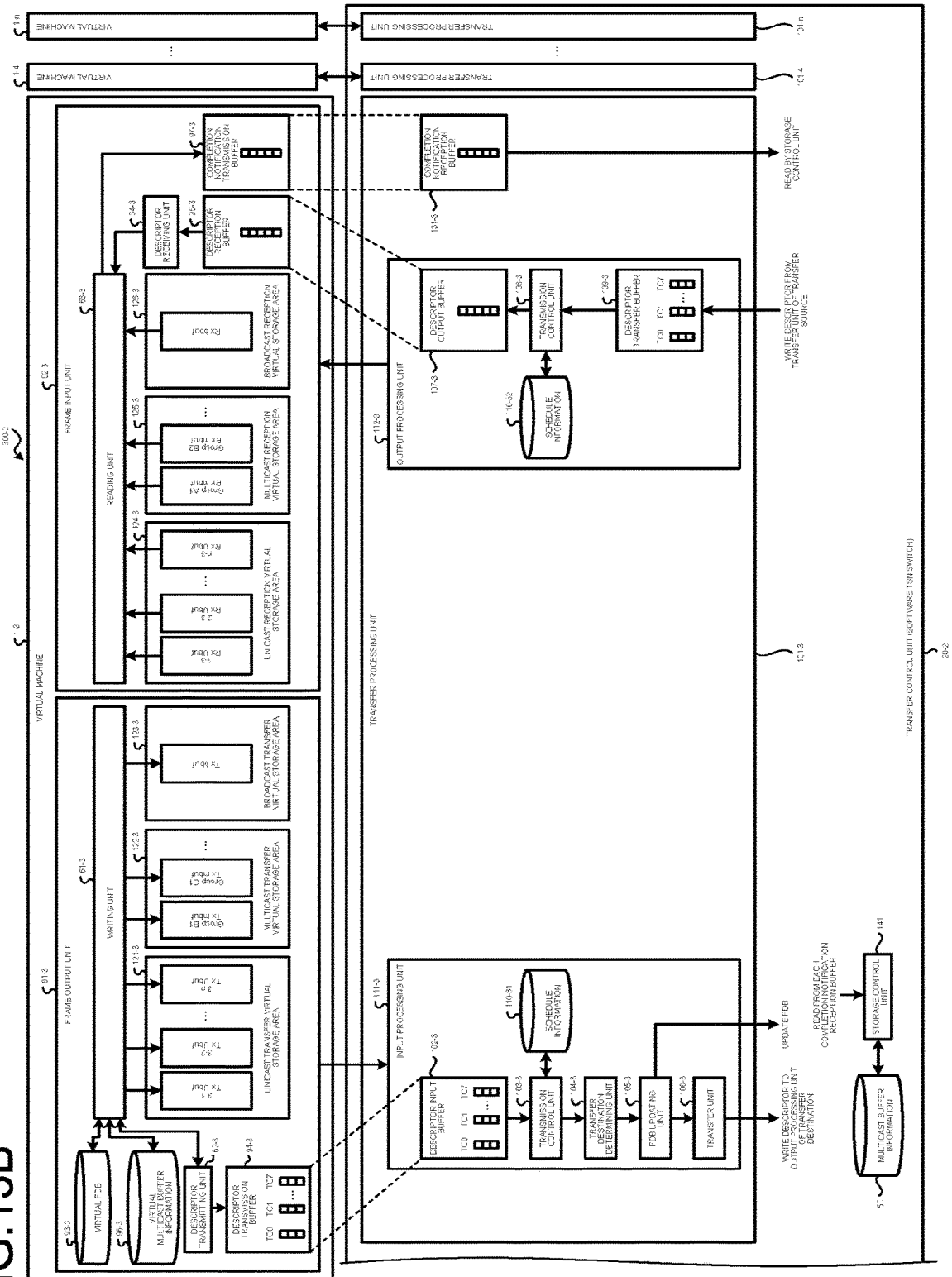
FIG. 13B is a diagram illustrating the example of the functional configuration of the communication apparatus according to the second embodiment.

FIGS. 13A and 13B are diagrams illustrating an example of a functional configuration of a communication apparatus 300-2 according to the second embodiment. In FIGS. 13A and 13B, n virtual machines 1 are connected to a transfer control unit 20-2.

A virtual machine 1-1 includes a frame output unit 91-1 and a frame input unit 92-1. Virtual machines 1-2 to 1-n also have the same configuration as that of the virtual machine 1-1.

Hereinafter, when the virtual machines 1-1 to 1-n need not be distinguished, the virtual machines 1-1 to 1-n will be simply referred to as virtual machine 1. Note that other components of which the number is plural may also be abbreviated when those components need not be distinguished, similarly to the virtual machines 1-1 to 1-n that are referred to as virtual machine 1.

Description of Frame Output Unit

The frame output unit 91 includes a writing unit 61, a unicast transfer virtual storage area 121, a multicast transfer virtual storage area 122, a broadcast transfer virtual storage area 123, a virtual FDB 93, virtual multicast buffer information 96, a descriptor transmitting unit 62, and a descriptor transmission buffer 94.

The writing unit 61 receives a transfer target frame from an application or network stack. The writing unit 61 refers to header information of the received frame and the virtual FDB 93 to determine a frame transfer destination.

In a case where the number of frame transfer destinations is one (unicast), the writing unit 61 writes the frame in the unicast transfer virtual storage area 121.

Here, a relationship between the unicast transfer virtual storage area 121 of the frame output unit 91 and a unicast reception virtual storage area 124 of the frame input unit 92 will be described. The unicast transfer virtual storage area 121 is used as a transmission buffer of the frame output unit 91, and the unicast reception virtual storage area 124 is used as a reception buffer of the frame input unit 92. The unicast transfer virtual storage area 121 and the unicast reception virtual storage area 124 are each divided into areas for each pair of a transfer source virtual machine 1 and a destination virtual machine 1. For example, in a case where a frame whose transfer source is a virtual machine 1 and whose destination is a virtual machine 3 is transferred, a 1-3 Tx Ubuf and a 1-3 Rx Ubuf are used.

Figure 14A:
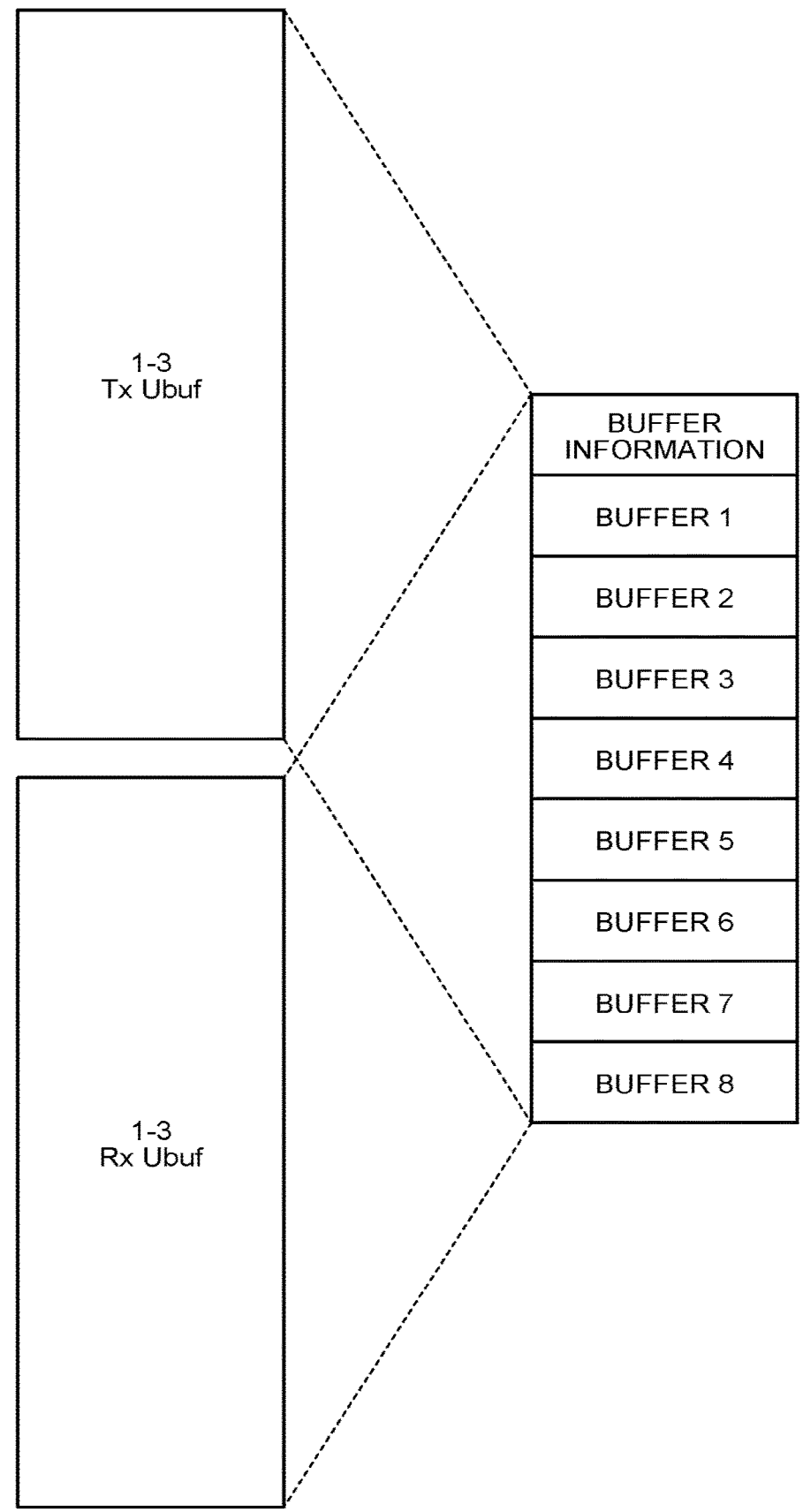
FIG. 14A is a diagram illustrating an example of a Tx Ubuf storage area and an Rx Ubuf storage area according to the second embodiment.
Figure 14B:
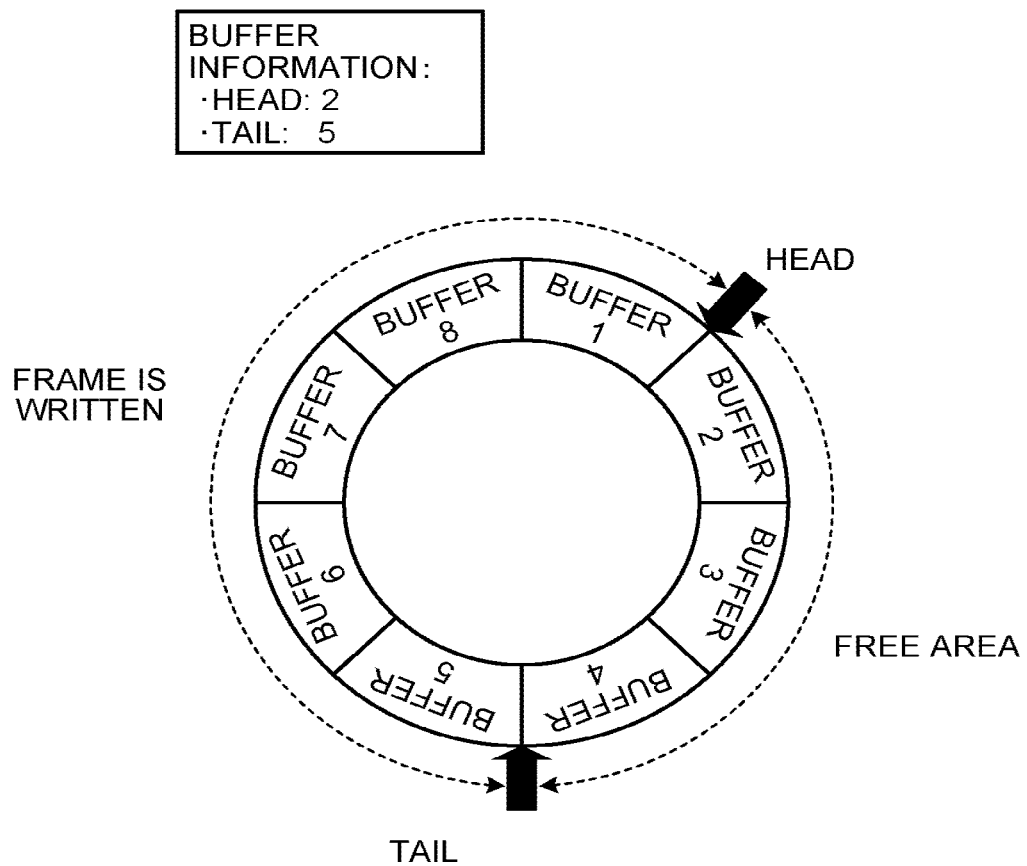
FIG. 14B is a diagram illustrating an example of a structure of each of the storage areas in FIG. 14A.

FIG. 14A is a diagram illustrating an example of the 1-3 Tx Ubuf storage area and the 1-3 Rx Ubuf storage area according to the second embodiment. FIG. 14B is a diagram illustrating an example of a structure of each of the storage areas of FIG. 14A.

The 1-3 Tx Ubuf storage area and the 1-3 Rx Ubuf storage area are mapped to the same physical memory area 46.

It is assumed that the 1-3 Tx Ubuf storage area and the 1-3 Rx Ubuf storage area are managed, for example, like a ring buffer in FIG. 14B, and a plurality of frames can be read and written at the same time, but the present invention is not limited thereto.

Returning to FIGS. 13A and 13B, in a case where frame transfer destinations are plural destinations (multicast), the writing unit 61 writes the frame in the multicast transfer virtual storage area 122. Further, in a case where frame transfer destinations are all destinations (broadcast), the writing unit 61 writes the frame in the broadcast transfer virtual storage area 123.

Note that the broadcast may be treated as a special case of the multicast, and the multicast transfer virtual storage area 122 and the broadcast transfer virtual storage area 123 do not have to be distinguished.

Next, a case where the writing unit 61 processes a multicast/broadcast frame will be described. First, the writing unit 61 refers to the virtual FDB 93 to determine a destination of the frame.

Here, the virtual FDB 93 will be described. A pseudo-physical memory (virtual memory) that stores the virtual FDB 93 of each virtual machine 1 is mapped to a storage unit (physical memory) that stores an FDB 120 of the transfer control unit 20-2. That is, the respective virtual machines 1 refer to the same FDB 120. Mapping between the virtual FDB 93 and the FDB 120 is performed, for example, when the communication apparatus 300-2 (switch) is initialized.

Further, in the example of FIGS. 13A and 13B, the update of the FDB 120 is performed by the transfer control unit 20-2 (FDB updating unit 105), and the frame output unit 91 performs reading (Read-Only). The FDB 120 (virtual FDB 93) includes information for determining a transfer destination of the frame. Specifically, the information for determining the transfer destination includes information such as an identifier of a transfer destination network port (network interface or virtual machine 1), a MAC address, a VLAN ID, and the last transmission time.

In a case where it is determined that the frame is a multicast/broadcast frame, the writing unit 61 specifies the multicast transfer virtual storage area 122/broadcast transfer virtual storage area 123 as a write destination by using a multicast transfer virtual storage area ID included in an entry in the FDB 93.

Next, the writing unit 61 refers to the virtual multicast buffer information 96 corresponding to the specified multicast transfer virtual storage area 122/broadcast transfer virtual storage area 123.

The virtual multicast buffer information 96 is stored in a virtual memory 43 (pseudo-physical memory) mapped to a recording area (physical memory 45) in which multicast buffer information 50 managed by the transfer control unit 20-2 to be described later is stored.

The writing unit 61 specifies, based on the virtual multicast buffer information 96, a free buffer of a multicast storage area 31 mapped to the multicast transfer virtual storage area 122/broadcast transfer virtual storage area 123, and selects the free buffer.

Next, the writing unit 61 writes the frame in the selected buffer. Then, after writing the frame, the writing unit 61 updates a bitmap and a free state of the multicast buffer information 50 and notifies the descriptor transmitting unit 62 of the update.

The descriptor transmitting unit 62 writes a descriptor of the transfer target frame in the descriptor transmission buffer 94.

The descriptor transmission buffer 94 and a descriptor input buffer 102 map the same physical memory area in advance, for example, when the communication apparatus 300-2 (switch) is initialized. The descriptor transmission buffer 94 and the descriptor input buffer 102 are used to deliver the descriptor between the frame output unit 91 and an input processing unit 111.

The descriptor transmission buffer 94 and the descriptor input buffer 102 are divided into queues (FIFOs) for each traffic class (TC) of a frame. A correspondence between a priority code point (PCP) included in an IEEE 802.1Q header and the traffic class is specified in advance.

The descriptor transmission buffer 94 is a virtual memory area (pseudo-physical memory area) managed by the virtual machine 1. The descriptor input buffer 102 is a memory area managed by the transfer control unit 20-2.

The descriptor transmitting unit 62 determines a position of the descriptor transmission buffer 94 in which the descriptor is to be written, based on a PCP or TC included in a received frame writing notification. The descriptor transmitting unit 62 stores the information received from the writing unit 61 in the descriptor and writes the descriptor in the descriptor transmission buffer 94. The descriptor may include a transmission time, statistical information, or the like, in addition to the information included in the frame writing notification received from the writing unit 61.

Further, for example, the descriptor transmitting unit 62 may receive only a buffer address of the transmission virtual storage area in which the frame is written by the writing unit 61, and the descriptor transmitting unit 62 may refer to header information and the like of the frame from the buffer to generate or write a descriptor. As described above, since the descriptor transmission buffer 94 is mapped to the same physical memory as the descriptor input buffer 102 of the transfer control unit 20-2, the descriptor transmission buffer 94 can be referenced by a transmission control unit 103 to be described later.

The frame output unit 91 has been described above.

Description of Transfer Control Unit

The transfer control unit 20-2 includes transfer processing units 101-1 to 101-$n$, the FDB 120, the multicast buffer information 50, and a storage control unit 141. The transfer processing units 101-1 to 101-$n$ are connected to the corresponding virtual machines 1-1 to 1-$n$, respectively. Note that the transfer control unit 20-2 may be implemented by a dedicated HW instead of software.

The transfer processing unit 101-1 includes an input processing unit 111-1, an output processing unit 112-1, and a completion notification reception buffer 131-1.

The input processing unit 111-1 includes an descriptor input buffer 102-1, a transmission control unit 103-1, a transfer destination determining unit 104-1, an FDB updating unit 105-1, a transfer unit 106-1, and schedule information 110-11.

The output processing unit 112-1 includes a descriptor output buffer 107-1, a transmission control unit 108-1, a descriptor transfer buffer 109-1, and schedule information 110-12.

The transfer processing units 101-2 to 101-$n$ also have the same configuration as that of the transfer processing unit 101-1.

First, an operation of the transmission control unit 103 will be described. First, the transmission control unit 103 checks a traffic class permitted for transmission, from a current time and the schedule information 110 (gate control list). Next, the transmission control unit 103 reads a descriptor of a transfer target frame from a queue (descriptor input buffer 102) of the traffic class permitted for transmission. In a case where frames (descriptors) of a plurality of traffic classes can be transmitted, the transmission control unit 103 determines a frame to be transferred by a method such as Strict Priority or Credit Based Shaper (IEEE 802.1Qav). The transmission control unit 103 inputs the read descriptor to the transfer destination determining unit 104. In a case where there is no frame that can be transmitted, the processing ends and the next frame transmission processing is performed (waiting until a new descriptor is written, waiting until a schedule state is changed, or the like).

The above-described operation is the operation of the transmission control unit 103. In addition to the above processing, the transmission control unit 103 may execute processing of determining whether the frame can be transmitted within a time allowed by a schedule in consideration of a guard band or the like, based on a frame size, a current time, and schedule information stored in the read descriptor. Further, although the processing of IEEE 802.1Qbv is assumed in the second embodiment, the present invention is not limited thereto.

Next, an operation of the transfer destination determining unit 104 will be described. The transfer destination determining unit 104 refers to an identifier of a transfer destination virtual machine 1 described in the descriptor, and determines the descriptor transfer buffer 109 in which the descriptor is to be written. For example, in a case where the transfer destination is the virtual machine 1-3, a descriptor transfer buffer 109-3 of the transfer processing unit 101-3 is a writing destination.

Next, an operation of the FDB updating unit 105 will be described. First, the FDB updating unit 105 checks whether or not an entry (MAC address and VLAN ID) of the transmission source virtual machine 1 exists in the FDB 120. In a case where the entry does not exist, the FDB updating unit 105 registers the entry and writes a network interface, a MAC address, a VLAN ID, the last transmission time, and the like. In a case where the entry exists, for example, the latest time of the entry is updated.

Finally, an operation of the transfer unit 106 will be described. The transfer unit 106 writes the descriptor in a queue of a corresponding traffic class of the descriptor transfer buffer 109 determined by the transfer destination determining unit 104. In a case of the multicast/broadcast, the descriptor is written in a plurality of descriptor transfer buffers. In a case of a single-task operation (for example, a case of an operation with a single-core CPU), the input processing unit 111 of each virtual machine 1 is operated in order, and thus the input of the descriptor is serialized in the descriptor transfer buffer 109. On the other hand, in a case of a multi-task operation (for example, a case of an operation with a multi-core CPU or a case of parallel processing in HW), since multiple input processings of the respective virtual machines 1 are executed in parallel, in the writing to the descriptor transfer buffer 109, it is necessary to prevent contention in access by taking a lock or the like to serialize a transfer order of the descriptors.

The above-described operation is the operation of the input processing unit 111. The input processing unit 111 can transfer the frame (descriptor) transmitted from each virtual machine 1 to the output processing unit 112 for the destination virtual machine 1 according to a transmission timing of IEEE 802.1Qbv. This means that the Qbv processing of the network interface of the transmission source virtual machine 1 is performed (corresponding to Tx_be in FIG. 10).

Next, an operation of the output processing unit 112 will be described. In an operation of the transmission control unit 108, basically, the same processing as that of the transmission control unit 103 of the input processing unit 111 is performed. In the transmission control unit 108 of the output processing unit 112, a reading source buffer is the descriptor transfer buffer 109, and a writing destination is the descriptor output buffer 107 (descriptor reception buffer 95). Here, the descriptor output buffer 107 (descriptor reception buffer 95) of FIGS. 13A and 13B provides one queue (FIFO), but the descriptor output buffer 107 may also be divided into queues for each traffic class, similarly to the descriptor input buffer 102 or the descriptor transfer buffer 109.

The output processing unit 112 has been described above. The output processing unit 112 can transfer the descriptor to the destination virtual machine 1 according to the transmission timing of IEEE 802.1Qbv. This means that the Qbv processing of the network interface of the transfer control unit 20-2 (switch) is performed (corresponding to Tx in FIG. 10).

Finally, an operation of the storage control unit 141 will be described. Once a completion notification is received from the completion notification reception buffer 131, the storage control unit 141 updates the multicast buffer information 50. The storage control unit 141 sets a bit corresponding to the interface that has transmitted the completion notification to a referenced state (read state). Here, in a case where all interfaces belonging to the multicast group are in the referenced state, the storage control unit 141 sets a buffer state to a free state to release the buffer.

The transfer control unit 20-2 has been described above.

Description of Frame Input Unit

The frame input unit 92 includes a reading unit 63, the unicast reception virtual storage area 124, a multicast reception virtual storage area 125, a broadcast reception virtual storage area 126, the descriptor reception buffer 95, a descriptor receiving unit 64, and a completion notification transmission buffer 97.

The descriptor reception buffer 95 is a virtual memory area (pseudo-physical memory area) managed by the virtual machine 1. The descriptor output buffer 107 is a memory area managed by the transfer control unit 20-2.

The descriptor reception buffer 95 and the descriptor output buffer 107 map the same physical memory area in advance, for example, when the communication apparatus 300-2 (switch) is initialized. The descriptor reception buffer 95 and the descriptor output buffer 107 are used to deliver a descriptor between the frame input unit 92 and the output processing unit 112.

First, the descriptor receiving unit 64 reads a descriptor from a queue (FIFO) of the descriptor reception buffer 95. In a case of the unicast, the descriptor receiving unit 64 specifies an Rx Ubuf (Tx Ubuf) storage area in which the frame is stored from the descriptor and makes a notification to the reading unit 63. Further, in a case of multicast (broadcast), the descriptor receiving unit 64 specifies the multicast reception virtual storage area 125 (broadcast reception virtual storage area 126) in which the frame is stored from the descriptor and makes a notification to the reading unit 63.

In a case of the unicast, the reading unit 63 refers to buffer information of the notified Rx Ubuf (Tx Ubuf) storage area (FIG. 14B) and reads the first frame (a frame written at a Tail position). Further, in a case of the multicast (broadcast), the reading unit 63 reads a multicast frame (broadcast frame) from the notified storage area. The reading unit delivers the read frame to the application or network stack. Once the frame transfer is completed, the reading unit 63 inputs a read completion notification to the completion notification transmission buffer 97.

The completion notification transmission buffer 97 is used for delivering information for notifying the storage control unit 141 of the transfer control unit 20-2 that the reading unit 63 has read the frame. In the example of FIGS. 13A and 13B, the completion notification is delivered by mapping the completion notification transmission buffer 97 to a storage area of the physical memory 45 that stores the completion notification reception buffer 131 of the transfer control unit 20-2.

Once the read completion notification is read from the completion notification reception buffer 131, the storage control unit 141 releases the buffer of which reading is completed. In a case of the unicast, the storage control unit 141 increments Tail by +1 (FIG. 14B).

The completion notification in a case of the multicast (broadcast) includes a multicast transfer virtual storage area ID (FIG. 5) for identifying multicast buffer information 50 of the received frame, a buffer ID (FIGS. 6A and 6B) for identifying a buffer area, and the like.

Here, the unicast will be additionally described. In the second embodiment, in the unicast processing, the buffer information is managed like a ring buffer. However, even in the unicast processing, the buffer information may be managed in the same manner as the multicast or broadcast. In this case, even for the unicast frame, the transfer is controlled by referring to the multicast buffer information 50. In this case, since there is one destination, the transfer control unit 20-2 uses only one bit of the bitmap as information for managing whether or not the frame has been read.

As described above, the communication apparatus 300-2 according to the second embodiment includes the plurality of virtual machines 1 and the transfer control unit 20-2.

In the virtual machine 1, the storage unit (virtual memory 43 or pseudo-physical memory 44) includes the multicast transfer virtual storage area 122 that is mapped to the multicast storage area 31 specified for each multicast group. The multicast storage area 31 stores a multicast frame addressed to virtual machines 1 belonging to a multicast group. The writing unit 61 writes the multicast frame in the multicast transfer virtual storage area 122. The descriptor transmitting unit 62 outputs a descriptor of the multicast frame to the plurality of virtual machines 1 belonging to the multicast group. The descriptor receiving unit 64 receives the descriptor of the multicast frame. When the descriptor is received by the descriptor receiving unit 64, the reading unit 63 reads the multicast frame from the multicast reception virtual storage area 125 mapped to the multicast storage area 31 specified based on the descriptor.

In the transfer control unit 20-2, the input processing unit 111 controls a timing for inputting the descriptor of the multicast frame to the output processing unit 112 based on the schedule information 110. Then, the output processing unit 112 controls a timing for outputting the descriptor to the plurality of virtual machines belonging to the multicast group based on the schedule information 110 when the descriptor is received from the input processing unit 111.

As a result, according to the communication apparatus 300-2 of the second embodiment, the same effect as that of the communication apparatus 300 according to the first embodiment can be obtained.

Finally, an example of a hardware configuration of each of the communication apparatuses 300 and 300-2 according to the first and second embodiments will be described.

Example of Hardware Configuration

Figure 15:
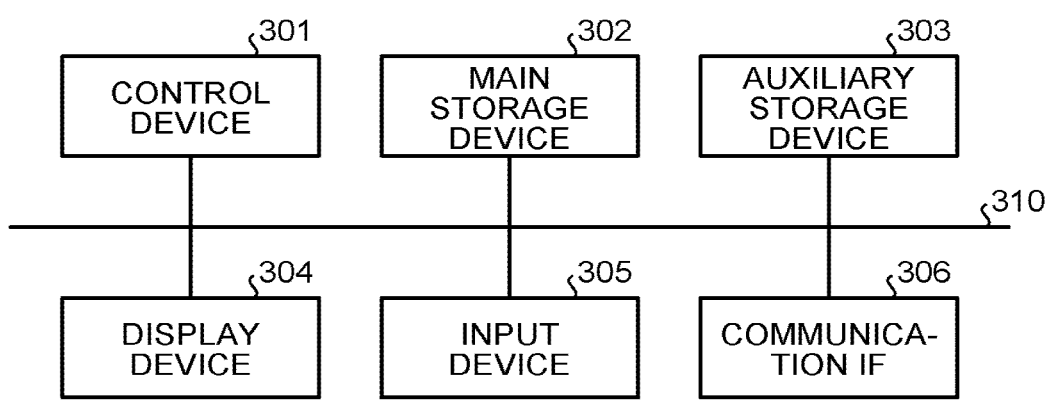
FIG. 15 is a diagram illustrating an example of a hardware configuration of each of the communication apparatuses according to the first and second embodiments.

FIG. 15 is a diagram illustrating an example of a hardware configuration of each of the communication apparatuses 300 and 300-2 according to the first and second embodiments.

The communication apparatuses 300 and 300-2 each include a control device 301, a main storage device 302, an auxiliary storage device 303, a display device 304, an input device 305, and a communication IF 306. The control device 301, the main storage device 302, the auxiliary storage device 303, the display device 304, the input device 305, and the communication IF 306 are connected via a bus 310.

The control device 301 executes a program that the main storage device 302 reads from the auxiliary storage device 303. The main storage device 302 is a memory such as a read only memory (ROM) and a random access memory (RAM). The auxiliary storage device 303 is a hard disk drive (HDD), a solid state drive (SSD), a memory card, or the like.

The display device 304 displays display information. The display device 304 is, for example, a liquid crystal display. The input device 305 is an interface for operating a computer operated as the communication apparatus 300. The input device 305 is, for example, a keyboard or a mouse. Note that the display device 304 and the input device 305 may use a display function and an input function of an external management terminal or the like connectable to the communication apparatuses 300 and 300-2.

The communication IF 306 is an interface for performing communication with other devices.

The program executed by the computer is an installable or executable file, is recorded in a computer-readable storage medium such as a CD-ROM, a memory card, a CD-R, or a digital versatile disc (DVD), and is provided as a computer program product.

Further, the program executed by the computer may be stored in a computer connected to a network such as the Internet and may be provided by being downloaded via the network. Alternatively, the program executed by the computer may be provided via a network such as the Internet without being downloaded.

Further, the program executed by the computer may be provided by being incorporated in a ROM or the like in advance.

The program executed by the computer has a module configuration including functional blocks that can also be implemented by a program in the functional configuration (functional blocks) of the communication apparatus 300 described above. As the actual hardware, the control device 301 reads the program from a storage medium and executes the program, such that the respective functional blocks are loaded on the main storage device 302. That is, the respective functional blocks are generated on the main storage device 302.

Note that some or all of the functional blocks described above may be implemented by hardware such as an integrated circuit (IC) instead of being implemented by software.

Further, in a case of implementing the respective functions using a plurality of processors, each processor may implement one of the functions, or may implement two or more of the functions.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Example. A communication apparatus includes a plurality of virtual machines and a transfer control unit. Each of the virtual machines includes a storage unit, a writing unit, a descriptor output unit, a descriptor receiving unit, and a reading unit. The storage unit includes a multicast transfer virtual storage area mapped to a multicast storage area specified for each multicast group and storing a multicast frame addressed to virtual machines belonging to the multicast group. The writing unit is configured to write the multicast frame into the multicast transfer virtual storage area. The descriptor output unit is configured to output a descriptor of the multicast frame to the plurality of virtual machines belonging to the multicast group. The descriptor receiving unit is configured to receive the descriptor of the multicast frame. The reading unit is configured to read the multicast frame from a multicast reception virtual storage area mapped to the multicast storage area specified based on the descriptor when the descriptor is received by the descriptor receiving unit. The transfer control unit includes an input processing unit and an output processing unit. The input processing unit is configured to control, based on schedule information, a timing for inputting the descriptor of the multicast frame to the output processing unit, and the output processing unit is configured to control, based on the schedule information, a timing for outputting the descriptor to the plurality of virtual machines belonging to the multicast group when the descriptor is received from the input processing unit.

What is claimed is:
1. A communication apparatus comprising:
a host processor;
a plurality of virtual machines;
a storage unit that includes a multicast storage area specified for each multicast group and storing a multicast frame addressed to virtual machines belonging to the multicast group:
a transfer unit configured to write the multicast frame into a multicast transfer virtual storage area mapped to the multicast storage area; and
a descriptor output unit configured to output a descriptor of the multicast frame to the virtual machines belonging to the multicast group,
each of the virtual machines comprising:
a descriptor receiving unit configured to receive the descriptor from the descriptor output unit, and a reading unit configured to read the multicast frame from the multicast storage area specified based on the descriptor when the descriptor is received by the descriptor receiving unit.

2. The apparatus according to claim 1, further comprising a storage control unit configured to release the multicast storage area after the multicast frame is read by the reading unit of each of the virtual machines belonging to the multicast group.

3. The apparatus according to claim 2, wherein the storage control unit holds information indicating whether or not the reading unit of each of the virtual machines belonging to the multicast group has read the multicast frame, in a form of a bitmap.

4. The communication apparatus according to claim 1, further comprising
a storage control unit configured to map a multicast reception virtual storage area to the multicast storage area when an entry of a multicast frame is registered in transfer destination information,
wherein the reading unit reads the multicast frame from the multicast reception virtual storage area mapped to the multicast storage area specified based on the descriptor when the descriptor is received by the descriptor receiving unit.

5. The apparatus according to claim 4, wherein the storage control unit releases the mapping between the multicast reception virtual storage area and the multicast storage area when the entry of the multicast frame is deleted from the transfer destination information.

6. The apparatus according to claim 1, further comprising
a storage control unit configured to map a multicast reception virtual storage area to the multicast storage area when a notification of joining the multicast group is received,
wherein the reading unit reads the multicast frame from the multicast reception virtual storage area mapped to the multicast storage area specified based on the descriptor when the descriptor is received by the descriptor receiving unit.

7. The apparatus according to claim 6, wherein the storage control unit releases the mapping between the multicast reception virtual storage area and the multicast storage area when a notification of leaving the multicast group is received.

8. A communication method comprising:
writing, into a multicast transfer virtual storage area mapped to a multicast storage area specified for each multicast group and storing a multicast frame addressed to virtual machines belonging to the multicast group, the multicast frame;
outputting, by a descriptor output unit, a descriptor of the multicast frame to the virtual machines belonging to the multicast group;
receiving, by a descriptor receiving unit of each of the virtual machines, the descriptor from the descriptor output unit; and
reading, by a reading unit of each of the virtual machines the multicast frame from the multicast storage area specified based on the descriptor when the descriptor is received by the descriptor receiving unit.

9. A computer program product comprising a non-transitory computer-readable medium including programmed instructions, the instructions causing a computer including a plurality of virtual machines to execute:
writing, into a multicast transfer virtual storage area mapped to a multicast storage area specified for each multicast group and storing a multicast frame addressed to virtual machines belonging to the multicast group, the multicast frame;
outputting, by a descriptor output unit, a descriptor of the multicast frame to the virtual machines belonging to the multicast group;
receiving, by a descriptor receiving unit of each of the virtual machines, the descriptor from the descriptor output unit; and
reading, by a reading unit of each of the virtual machines, the multi cast frame from the multicast storage area specified based on the descriptor when the descriptor is received by the descriptor receiving unit.

* * * * *